(12) United States Patent
Sato

(10) Patent No.: US 7,764,342 B2
(45) Date of Patent: Jul. 27, 2010

(54) LIQUID CRYSTAL DISPLAY APPARATUS

(75) Inventor: Takeshi Sato, Kokubunji (JP)

(73) Assignee: Hitachi Displays, Ltd., Chiba (JP)

( * ) Notice: Subject to any disclaimer, the term of this patent is extended or adjusted under 35 U.S.C. 154(b) by 244 days.

(21) Appl. No.: 12/155,083

(22) Filed: May 29, 2008

(65) Prior Publication Data
US 2008/0316400 A1  Dec. 25, 2008

(30) Foreign Application Priority Data
Jun. 21, 2007  (JP) ............................. 2007-163274

(51) Int. Cl.
*G02F 1/1335* (2006.01)
(52) U.S. Cl. .................... 349/113; 349/114; 349/47
(58) Field of Classification Search ............ 349/47, 349/113, 114
See application file for complete search history.

(56) References Cited
U.S. PATENT DOCUMENTS
2004/0114074 A1  6/2004  Yamamoto

| | | | |
|---|---|---|---|
| 2007/0013842 A1 * | 1/2007 | Yang et al. | 349/114 |
| 2007/0222925 A1 * | 9/2007 | Park et al. | 349/114 |
| 2008/0055504 A1 * | 3/2008 | Choi et al. | 349/38 |

FOREIGN PATENT DOCUMENTS

| JP | 10-186414 | 12/1996 |
|---|---|---|
| JP | 2001-350158 | 6/2000 |
| JP | 2004-029650 | 6/2002 |
| JP | 2005-338256 | 5/2004 |

* cited by examiner

*Primary Examiner*—Hemang Sanghavi
(74) *Attorney, Agent, or Firm*—Stites & Harbison PLLC; Juan Carlos A. Marquez, Esq.

(57) ABSTRACT

A liquid crystal display apparatus includes pixel electrodes each supplied with a video signal from a drain bus line through a thin-film transistor driven by a scanning signal from a gate bus line. The pixel includes at least a light reflection film within its area, the light reflection film is flush with the drain bus line, having its surface formed with concave and convex ruggedness segments, the pixel electrode is formed on the top of an insulator film formed to cover the light reflection film and having its surface flattened or leveled and an electrode overlapping the light reflection film and insulated from the pixel electrode is intervened in the insulator film.

11 Claims, 16 Drawing Sheets

LIQUID CRYSTAL DISPLAY APPARATUS

INCORPORATION BY REFERENCE

The present application claims priority from Japanese application JP2007-163274 filed on Jun. 21, 2007, the content of which is hereby incorporated by reference into this application.

BACKGROUND OF THE INVENTION

The present invention relates to liquid crystal display apparatus and more particularly, to a so-called transreflective liquid crystal display apparatus having a light reflection domain in part of a pixel area.

In the field of liquid crystal display apparatus, the transreflective liquid crystal display apparatus has been known as causing images to be recognized by using even a light source of external light such as for example the sun light.

This type of liquid crystal display apparatus can be constructed by providing, for example, a light reflection domain having a light reflection film in addition to a light transmission domain for transmitting light from a backlight so that images may be recognized even when the backlight is turned off.

The liquid crystal display apparatus of the type as above is disclosed in, for example, JP-A-2001-350158, JP-A-2004-29650, JP-A-10-186414 and JP-A-2005-338256.

SUMMARY OF THE INVENTION

Generally, in the liquid crystal display apparatus constructed as above, it is practice that in the light reflection film formed within the light reflection domain of each pixel, ruggedness segments for causing reflection light to scatter are formed on the surface of the light reflection film. This is to ensure that the picture quality in the light reflection domain can be improved.

In this case, even with an insulator film is formed to cover the light reflection film, the ruggedness on the light reflection film reflects on the surface of the insulator film, with the result that the thickness of a layer of liquid crystals becomes irregular in the light reflection domain, giving rise to inexpedience of degrading the contrast.

Further, when the light reflection film will sometimes be formed in flush with, for example, a signal bus line for the purpose of reducing the number of production steps but the light reflection film is physically separated from the signal bus line to keep stray capacitance from being set up between adjacent pixel electrodes, thus raising a disadvantage that the area of the light reflection film cannot be increased, failing to maintain a large light reflection factor.

An object of the present invention is to provide a liquid crystal display apparatus capable of increasing the quality of display in the light reflection domain without increasing the number of production steps.

Examples typified by the present invention disclosed in the present application will be outlined briefly in the following.

(1) A liquid crystal display apparatus according to the present invention comprises pixel electrodes each supplied with a video signal from a drain bus line through a thin-film transistor driven by a scanning signal from, for example, a gate bus line, the pixel includes at least a light reflection film within its area, the light reflection film is flush with the drain bus line, having its surface formed with concave and convex ruggedness segments, the pixel electrode is formed on an insulator film formed to cover the light reflection film and having its surface leveled, and an electrode overlapping the light reflection film and insulated from the pixel electrode is intervened in the insulator film.

(2) A liquid crystal display apparatus according to the invention subordinates to, for example, the (1) construction and the pixel electrode and the electrode insulated from the pixel electrode are each formed of a transparent electrically conductive film.

(3) A liquid crystal display apparatus according to the invention subordinates to, for example, the (1) construction and the light reflection film is connected to one of drain bus lines positioned on both sides of a pixel and separated from the other drain bus line and at least a projection or extension of the gate bus line overlaps the separation portion.

(4) A liquid crystal display apparatus according to the invention subordinates to, for example, the (2) construction and the liquid crystal display apparatus is of the in plane switching type and the pixel electrode is so formed as to overlap the electrode insulated from the pixel electrode, a group of a plurality of the pixel electrodes being provided.

(5) A liquid crystal display apparatus according to the invention subordinates to, for example, the (2) construction and the liquid crystal display apparatus is of the longitudinal field type and the electrode insulated from the pixel electrode is a capacitor electrode.

(6) A liquid crystal display apparatus according to the invention subordinates to, for example, the (1) construction and the electrode insulated from the pixel electrode is formed of a light reflection film having ruggedness on its surface.

(7) A liquid crystal display apparatus according to the invention subordinates to, for example, the (6) construction and the light reflection film flush with the drain bus line and the electrode insulated from the pixel electrode constitute a capacitor element having as a dielectric film the insulator film interposed between the light reflection film and the electrode.

(8) A liquid crystal display apparatus according to the invention subordinates to, for example, the (6) construction and the electrode insulated from the pixel electrode is so formed as to stride over the respective drain bus lines on the both sides of a pixel.

(9) A liquid crystal display apparatus according to the invention subordinates to, for example, the (1) construction and the reflection film is electrically connected directly to a drain region of the thin-film transistor by way of a through hole formed in an insulator film underlying the reflection film.

(10) A liquid crystal display apparatus according to the invention subordinates to, for example, the (1) construction and the pixel electrode is electrically connected directly to a source region of the thin-film transistor by way of a through hole formed in an insulator film underlying the pixel electrode.

(11) A liquid crystal display apparatus according to the invention subordinates to, for example, the (1) construction and a semiconductor layer of the thin-film transistor is comprised of a poly-silicon layer.

It should be understood that the present invention is in no way limited to the foregoing constitution but can be altered or modified without departing from the technical idea of the invention.

The liquid crystal display apparatus constructed as above can improve the quality of display in the light reflection domain without increasing the number of production steps.

DETAILED DESCRIPTION OF THE EMBODIMENTS

Embodiments of a liquid crystal display apparatus according to the present invention will now be described with reference to the accompanying drawings.

Embodiment 1

(Equivalent Circuit)

Figure 9:
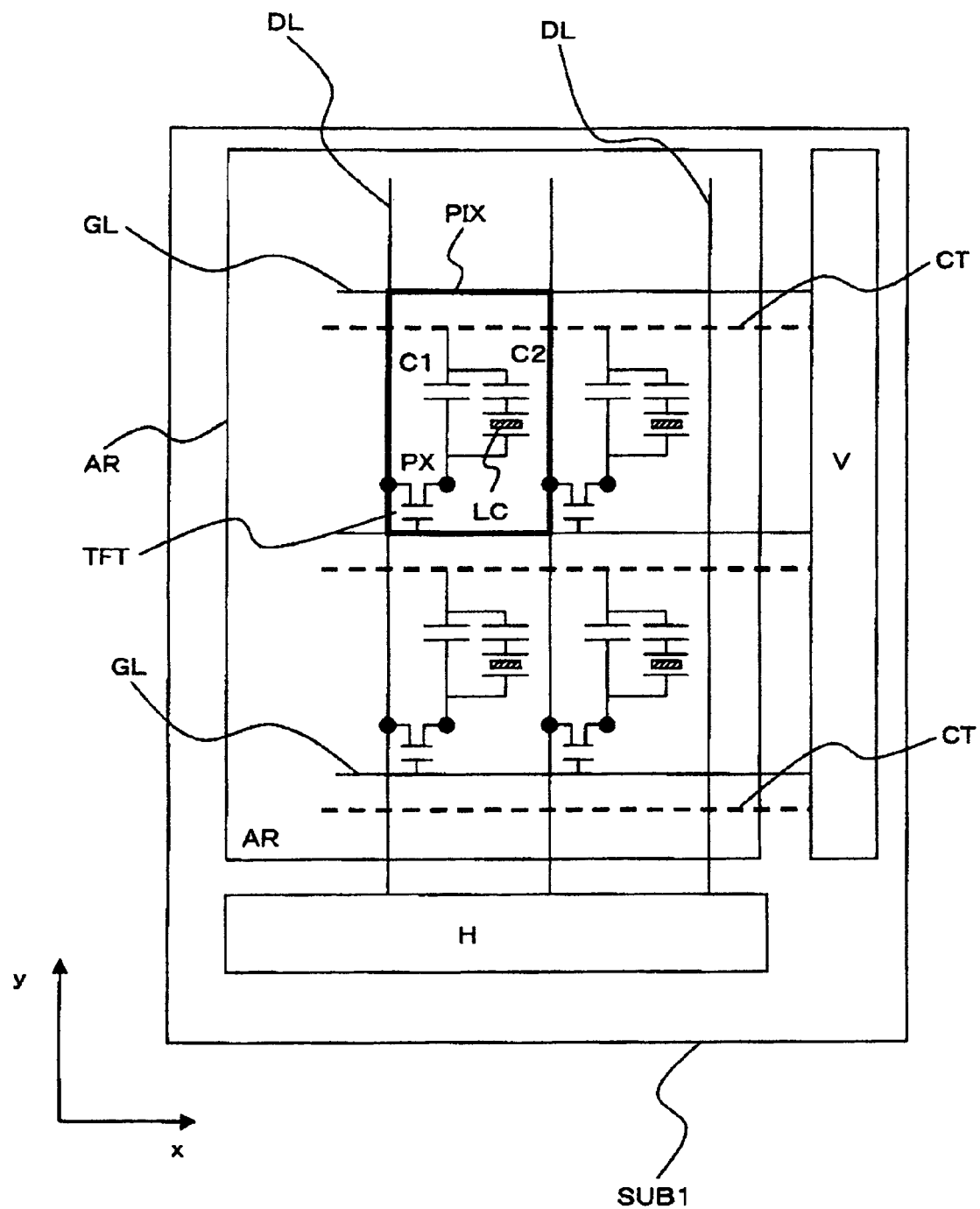
FIG. 9 is an equivalent circuit diagram showing the overall construction of the liquid crystal display apparatus according to embodiment 1 of the invention.

Referring first to FIG. 9, there is illustrated an equivalent circuit diagram showing a liquid crystal display apparatus according to embodiment 1 of this invention. The liquid crystal display apparatus in the present embodiment is of a so-called in plane switching type having substrates arranged to oppose to each other through a layer of liquid crystals and one of these substrates SUB1 is provided, in its pixel area close to or nearby the liquid crystal layer, with a pixel electrode and a counter electrode.

In FIG. 9, the substrate SUB1 is made of, for example, glass and on its surface confronting the liquid crystal layer, gate bus lines GL laid to extend in x direction and juxtaposed in y direction and drain bus lines DL extending in y direction and juxtaposed in x direction are formed.

A rectangular area surrounded by the gate bus lines GL and drain bus lines DL is an area in which a pixel PIX is formed. Then, individual pixels PIX thus formed are arranged in matrix and a set of these areas constitutes a liquid crystal display area AR.

In the area of each pixel PIX, a counter electrode CT is arranged which is laid in parallel to the gate bus line GL.

For example, one end of each gate bus line GL and one end of the counter electrode CT (right-hand ends in the figure) are connected to a scanning signal/counter electrode drive circuit V arranged externally of the liquid crystal display area AR. By means of the scanning signal/counter electrode drive circuit V, scanning signals are supplied sequentially to the individual gate bus lines GL and besides, a reference signal to which a video signal is referenced is supplied to a corresponding counter electrode CT.

For example, one end of each drain bus line DL (backward end in y direction on the sheet of drawing of the figure) is connected to a video signal drive circuit H arranged externally of the liquid crystal display area AR. By means of the video signal drive circuit H, a video signal is supplied to each drain bus line DL in synchronism with the timing of supply of the scanning signal.

Each pixel includes a thin-film transistor TFT to be turned on by a scanning signal from a gate bus line GL and so a video signal from a drain bus line DL is applied to a pixel electrode PX through the turned-on thin-film transistor TFT.

Then, an electric field complying with a potential difference between the pixel electrode PX and the counter electrode CT is applied to liquid crystals LC and molecules of liquid crystals behave in accordance with the electric field.

In this case, in addition to a capacitance due to the liquid crystals LC, a holding capacitance C1 and an insulator film capacitance C2 are set up between the pixel electrode PX and the counter electrode CT. With the help of the respective capacitances, an electric charge due to the video signal supplied to the pixel electrode PX can be stored in the pixel electrode PX for a relatively long time.

(Construction of Pixel)

Figure 1:
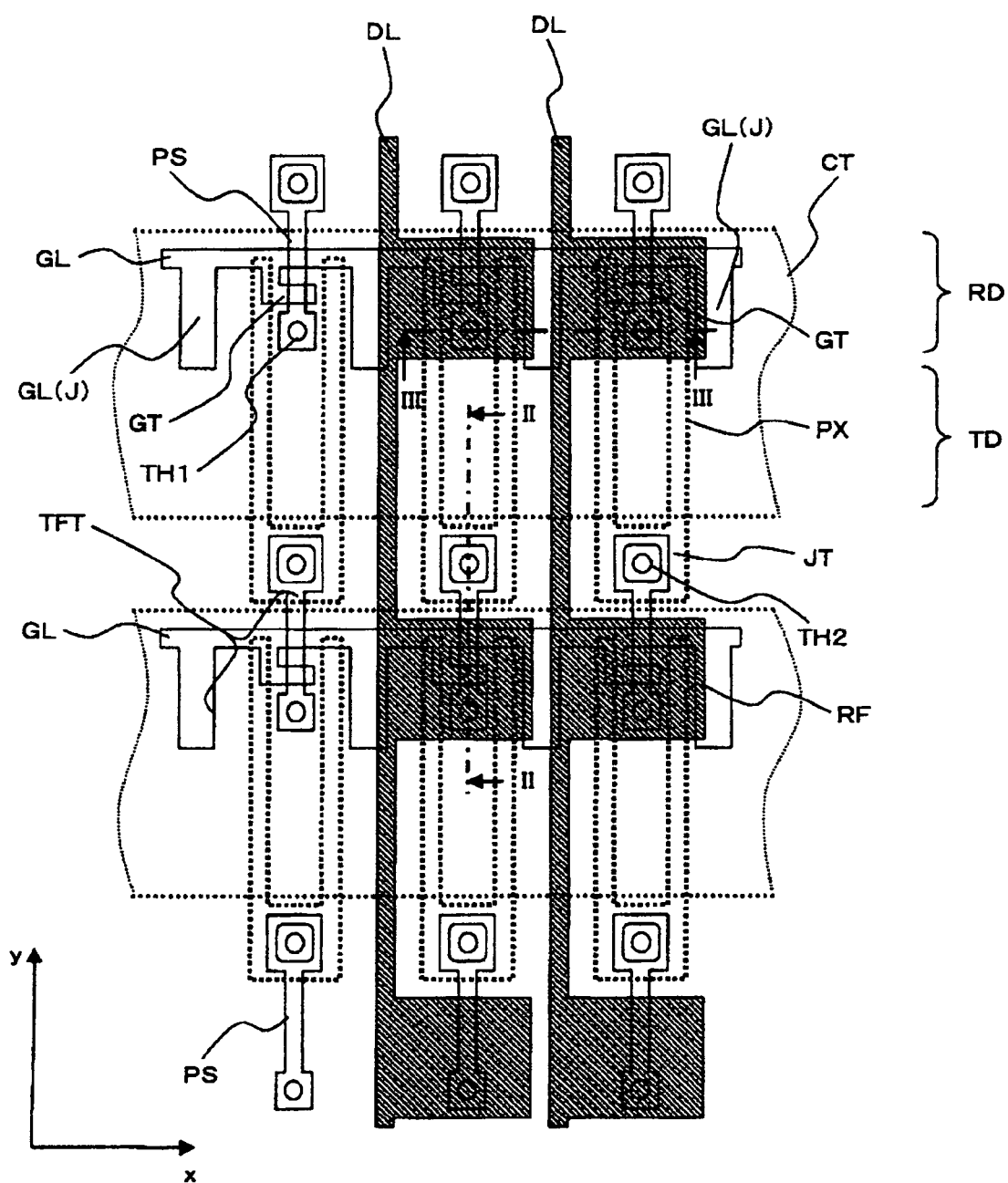
FIG. 1 is a plan view showing the construction of a liquid crystal display apparatus according to embodiment 1 of the present invention, especially depicting the surface, confronting a liquid crystal layer, of one of substrates arranged to oppose to each other through the liquid crystal layer.
Figure 2:
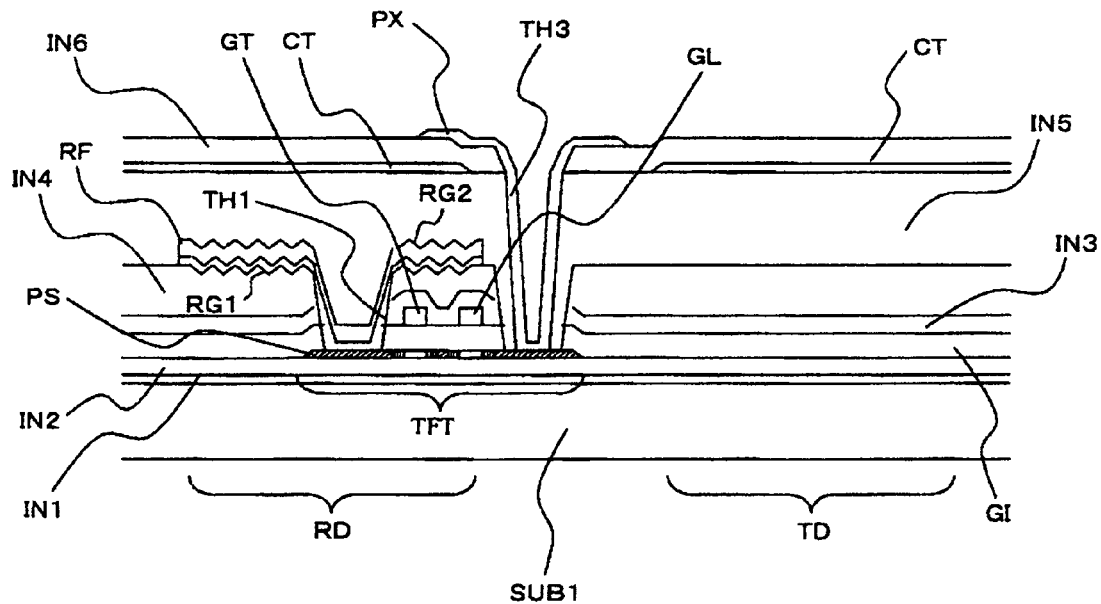
FIG. 2 is a sectional view taken on II-II line in FIG. 1.
Figure 3:
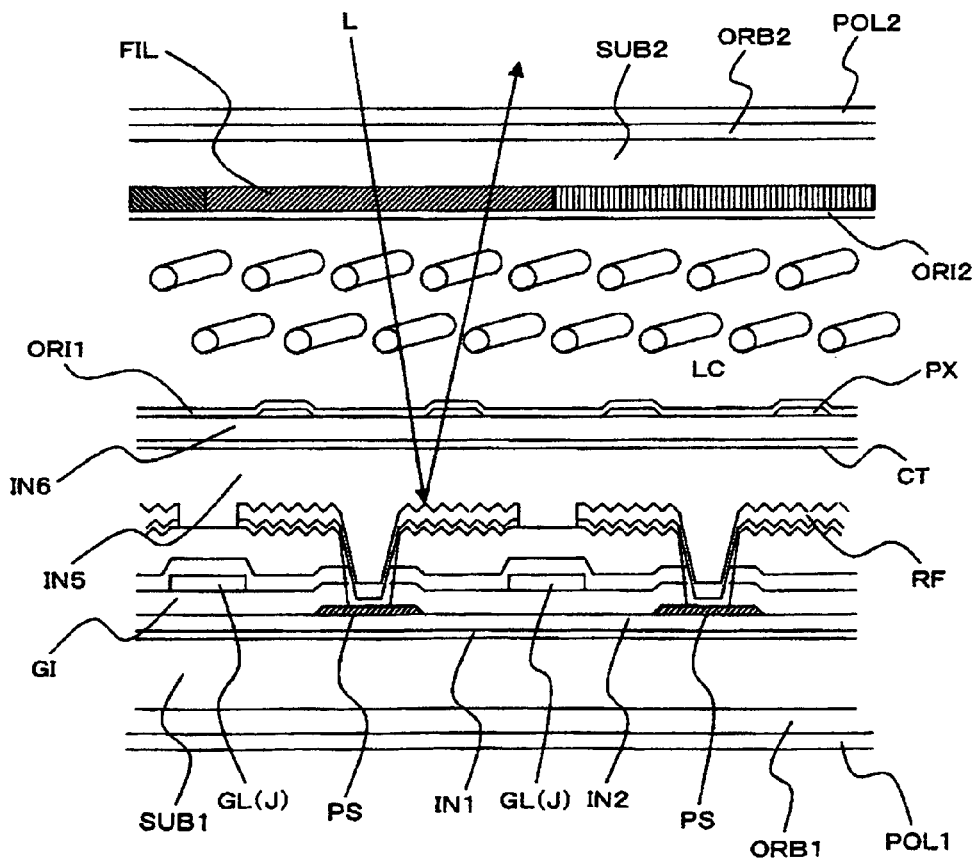
FIG. 3 is a sectional view taken on III-III line in FIG. 1, showing the other substrate with intervention of the liquid crystal layer.

Reference will now be made to FIGS. 1 to 3 to explain pixels of the liquid crystal display apparatus of the invention constructed as shown in a plan view form of FIG. 1 in which a structure of the surface, on the liquid crystal layer side, of one of the substrates arranged to oppose to each other through the liquid crystal layer is illustrated. A section taken on II-II line in FIG. 1 is depicted in FIG. 2 and a section taken on III-III line is depicted in FIG. 3.

In FIG. 1, one pixel is structured in each area surrounded by respective drain bus lines DL extending in y direction and juxtaposed in x direction and by respective gate bus lines GL extending in x direction and juxtaposed in y direction.

Then, in each pixel, a reflection domain RD is formed in an area preceding in y direction on the sheet of drawing of the figure and a transmission domain TD is formed in an area succeeding in y direction on the sheet of drawing.

In the present embodiment, a thin-film transistor TFT provided for a preceding pixel is formed in, for example, a reflection domain RD of another adjacently succeeding pixel.

As shown in FIG. 2, on the surface nearby liquid crystals of the substrate SUB1 made of glass, a ground insulator film IN1 made of SiN and a ground insulator film IN2 made of SiO are laminated sequentially. Each of the ground insulator films IN1 and IN2 has the function of preventing impurities inside the substrate SUB1 from migrating into a semiconductor layer PS to be described later.

The semiconductor layer PS having an island shape is formed on the surface of the ground insulator film IN2. The semiconductor layer PS is made of, for example, poly-silicon and is so formed as to act as a semiconductor layer of the transistor TFT functioning as a pixel drive device for each pixel.

The semiconductor layer PS extends in y direction in FIG. 1 and its one end lies in the region of the pixel and the other end lies in the region of another adjacently succeeding pixel.

As will be clarified from a description given later, the semiconductor layer PS is arranged such that the gate bus line GL (gate electrode GT) crosses a substantially central portion of the underlying layer PS through the medium of a gate insulator film GI and its one end side functions as a source region and the other end side functions as a drain region.

In the thin-film transistor TFT, the drain area exchanges with the source area depending on a state of applied bias but in the present specification, for convenience of explanation, the side connected to the drain bus line DL to be detailed later is termed a drain region area and the side connected to the pixel electrode PX to be detailed later is termed a source region.

Then, on the surface of a resulting structure of substrate SUB1 formed with the semiconductor layer PS, the insulator film GI made of, for example, SiO is formed. Within the formation area of the thin-film transistor TFT, the insulator film GI functions as a gate insulating film for the transistor TFT.

On the surface of the insulator film GI, one of the gate bus lines GL extending in x direction and juxtaposed in y direction in FIG. 1 is formed. The gate bus line GL is so formed as to overlie a substantially central portion of the semiconductor layer PS between the preceding and succeeding pixel areas as shown in FIG. 1.

Then, the gate bus line GL is patterned such that it branches near the intersection with the semiconductor layer PS to a gate electrode GT arranged to cross a substantially central portion of the underlying semiconductor layer PS. Here, the portion of the gate bus line GL crossing the underlying semiconductor layer PS also functions as the gate electrode of thin-film transistor TFT.

After completion of formation of the gate bus line GL and gate electrode GT, an impurity is doped by using the gate bus line GL and gate electrode GT as a mask in order that the thin-film semiconductor TFT having channels formed in the semiconductor layer PS under the gate bus line GL and gate electrode GT can be obtained.

The gate bus line GL is patterned to have also a projection or extension GL(J) extending in y direction in FIG. 1 until the adjacently succeeding pixel. As will be seen from a description given later, the projection GL (J) is formed to intervene in a gap between a reflection film (designated by RF in FIG. 1) and the drain bus line DL in the succeeding pixel toward which the projection GL(j) extends, thus acting as a reflection film different from the reflection film RF.

Thereafter, on the surface of a resulting structure of substrate SUB1 capped with the gate bus line GL, an insulator film IN3 made of, for example, SiN is formed and an insulator film IN4 made of an organic material such as resin is further formed by coating on the surface of insulator film IN3. With the insulator film IN4 formed, the surface of a resulting substrate structure can be flattened or leveled.

On the surface of the insulator film IN4, one of the drain bus lines DL extending in y direction and juxtaposed in x direction in FIG. 1 is formed.

The drain bus line DL is formed integrally with a reflection film RF formed in the reflection domain RD of each pixel which is, for example, rightward of the drain bus line in FIG. 1. Thus, the reflection film RF can be formed simultaneously with the formation of the drain bus line DL, so that the number of production steps can be reduced. In addition, the area of the reflection film RF can be increased apparently.

The reflection film RF is spaced apart from a righthand side drain bus line DL arranged adjacently to that drain bus line DL, leaving behind a slight gap so that mutual electrical connection of the adjacent drain bus lines DL may be prevented.

At the gap between the reflection film RF and the drain bus line DL, the projection or extension GL(J) of gate bus line GL is interposed to sufficiently fill up the gap from the standpoint of plan view form, enabling the projection GL(J) to have the light reflection function even at the gap.

The drain bus line DL and reflection film RF are formed as a laminated layer in which a MoW alloy layer and an Al alloy layer are laminated sequentially, permitting the Al alloy layer to function as a plane having good reflection efficiency in the reflection film RF.

The reflection film RF formed in the reflection domain RD of each pixel is so formed as to cover or cap the gate bus line GL (excepting the projection GL(J)) and the thin-film transistor TFT (excepting the end on the source region side).

The reflection film RF has its surface rugged to have many concave (convex) undulation segments RG2. By forming concave (convex) ruggedness RG1 on the surface of the insulator film IN4 on which at least the reflection film RF is formed, the concave (convex) ruggedness RG1 can be reflected on the surface of the overlying reflection film RF. With the many concave (convex) rugged segments RG2 formed on the surface of reflection film RF, light reflected at the reflection film RF can be scattered.

Then, the thus constructed reflection film RF can pass a through hole TH1 formed to pass through the underlying insulator films IN4 and IN3 and insulator film GI and can be directly (without resort to intervention of a drain electrode) connected to the drain region of thin-film transistor TFT. A video signal from the drain bus line DL can be supplied to the drain region of thin-film transistor TFT by way of the reflection film RF.

The surface of a resulting structure of substrate SUB1 formed with the drain bus line DL and reflection film RF in this manner is capped with an insulator film IN5 made of, for example, an organic material such as resin. The surface of the insulator film IN5 can be formed flatly even in the presence of the underlying reflection film RF formed with the concave (convex) rugged segments RG2. With the structure as above, the thickness of a layer of liquid crystals LC can be uniformed at at least the light reflection domain RD and therefore, the quality of display can be improved.

On the surface of insulator film IN5, a counter electrode CT in the form of a transparent conduction film such as for example an ITO (Indium Tin Oxide) film is formed.

The counter electrode CT is an electrode for generating an electric field between it and the pixel electrode PX to be described later and in each pixel, it is formed to cover the reflection domain RD and transmission domain TD, without covering an end of the source region of thin-film transistor TFT. In this manner, the counter electrode CT is intervened between the pixel electrode PX to be described later and the drain bus line DL by being insulated from them and even when the reflection film RF connected to the drain bus line DL in coplanar relation therewith is formed, an electric field from the drain bus line DL can be shielded by the counter electrode CT, failing to affect the pixel electrode PX and a degradation in the picture quality can be suppressed.

The reason why the counter electrode CT avoids covering the end of the source area of thin-film transistor TFT is that the pixel electrode PX to be described later is required to be electrically connected to the end of the source region.

The counter electrode CT of one pixel is mutually interconnected with the counter electrodes CT of pixels disposed adjacently in the right and left in FIG. 1, so that the counter electrode CT is so formed as to stride over the individual drain bus lines DL.

On the surface of a resulting structure of substrate SUB1 capped with the counter electrode CT in this manner, an insulator film IN6 made of, for example, SiN is formed.

Then, on the surface of this insulator film IN6, the pixel electrode PX in the form of a transparent conduction film made of, for example, ITO (Indium Tin Oxide) is formed.

The pixel electrode PX is comprised of an electrode group in which a plurality of (two in FIG. 1) stripe electrode segments are mutually connected at one end to provide connection portions JT and each electrode segment excepting the connection portion JT is arranged to overlap the counter electrode CT. In this case, an overlapping portion of the pixel electrode PX in association with the counter electrode CT is so formed as to set up a holding capacitor having the insulator film IN6 as a dielectric film.

The connection portion JT of pixel electrode PX passes a through hole TH3 formed to pass through the insulator films IN6, IN5, IN4, IN3 and GI so as to connect directly (without tracing through the source electrode) to a part of the source region of the thin-film transistor TFT.

The pixel electrode PX so formed as to overlap the counter electrode CT sets up between them a capacitor having the insulator film IN6 as a dielectric member.

(Substrate SUB2)

In FIG. 3, the substrate SUB1 is assembled with a substrate SUB2 to oppose it through the medium of the layer of liquid crystals LC, as indicated in a sectional view taken on III-III line in FIG. 1.

The structure of substrate SUB1 shown in FIG. 3 has one surface, nearby the layer of liquid crystals LC, capped with an alignment film ORI1 covering the pixel electrodes PX for the purpose of determining initial aligning directions of molecules of liquid crystals LC.

On the other surface of substrate SUB1 opposite to the one surface close to the liquid crystals, a phase difference plate ORB1 and a polarization plate POL1 are laminated sequentially. These plates cooperate with a phase difference plate ORB2 and a polarization plate POL2, which are formed on one surface (top) of the substrate SUB2 as will be described later, in order that behavior of molecules of liquid crystals LC can be visualized.

The substrate SUB2, opposing the substrate SUB1 by way of the liquid crystals LC, has the other surface close to the liquid crystals LC which is formed with a color filter FIL. In the color filter FIL, filter elements colored in, for example, red (R), green (G) and blue (B) are aligned sequentially in respect of individual pixels and this sequential alignment repeats itself.

Formed on the other surface of a resulting structure of substrate SUB2 provided with the color filter FIL is an alignment film ORI2.

On the one surface of substrate SUB2 remote from the liquid crystals LC, the aforementioned phase difference plate ORB2 and polarization plate POL2 are laminated sequentially.

With reference to FIG. 3, when the liquid crystal display apparatus is of light reflection type in function, external light such as the sun light, for example, behaves such that it transmits through the substrate SUB2 and the layer of liquid crystals LC and is then reflected by the reflection film RF capping the substrate SUB1 so as to transmit through the layer of liquid crystals LC and the substrate SUB2 as indicated at arrow L.

Effects by Construction of Embodiment 1

With the liquid crystal display apparatus constructed as above, even when the concave (convex) ruggedness is formed in the reflection film RF formed in the light reflection domain RD, the top surface of the resulting substrate structure is covered with the insulator film IN5 representing a leveling film and therefore, the layer of liquid crystals LC can be uniformed in thickness and the quality of display can be improved.

Further, the counter electrode CT is formed between the pixel electrode PX and the drain bus line DL by being insulated therefrom and therefore, even when the reflection film RF connected to the coplanar drain bus line is formed, an electric field from the drain bus line DL can be shielded by the counter electrode CT to prevent the electric field from affecting the pixel electrode PX, thus suppressing degradation in picture quality.

From the standpoint of plan view form, the gate bus line GL and its projection or extension GL(J) are arranged in a gap between the drain bus line DL connected to the reflection film RF of a pixel and the reflection film RF connected to the drain bus line DL of a pixel adjacent in x direction, thereby ensuring that the light reflection efficiency in the light reflection domain RD can be improved.

(Manufacturing Method)

Reference will now be made to FIGS. 4A to 8B showing an embodiment of production steps of manufacturing the liquid crystal apparatus shown in FIG. 1, especially illustrating procedures of manufacturing the structure on the surface, nearby the liquid crystal layer, of the substrate SUB1. Of these FIGS. 4A to 8B, figures suffixed with A are plan views and figures suffixed with B are sectional views taken on b-b line in the A figures. The following description will be given in order of production steps.

Figure 4A:
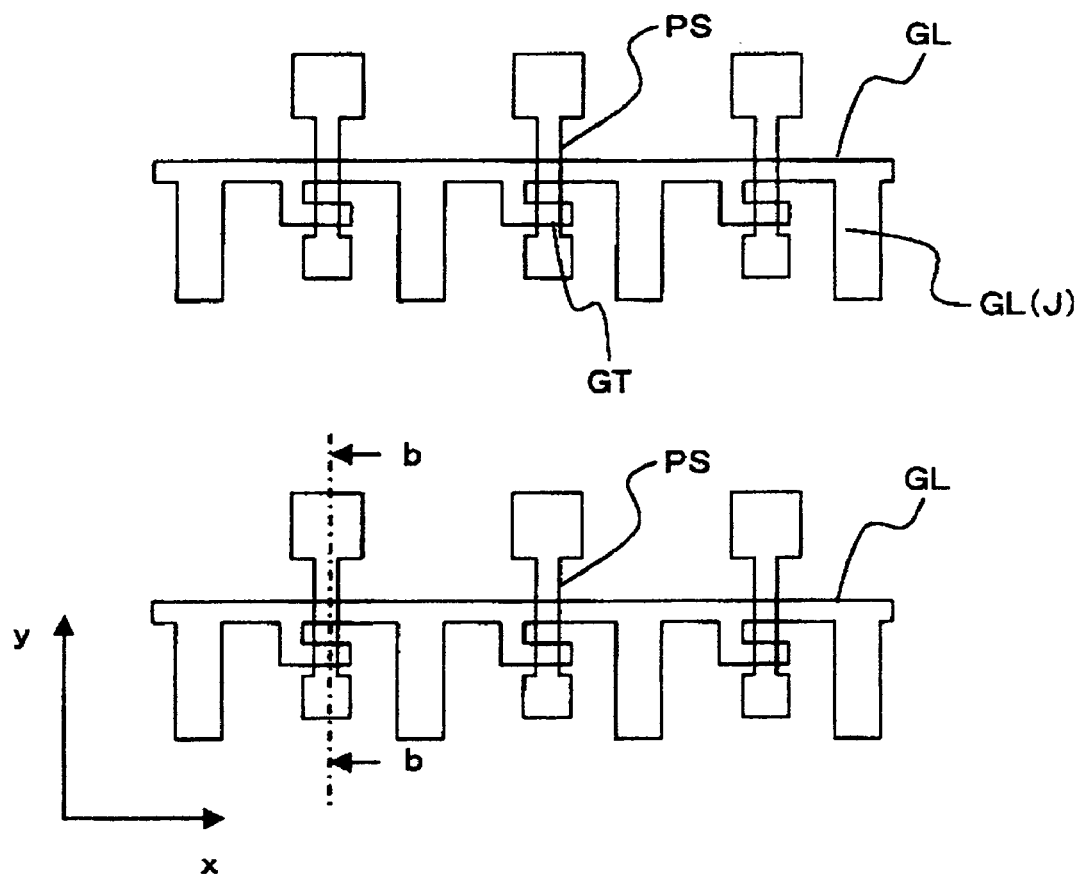
FIG. 4A is a diagram showing, together with FIGS. 5A to 8B, a series of production steps of a manufacturing method of the liquid crystal display apparatus according to embodiment 1 of the invention.
Figure 4B:
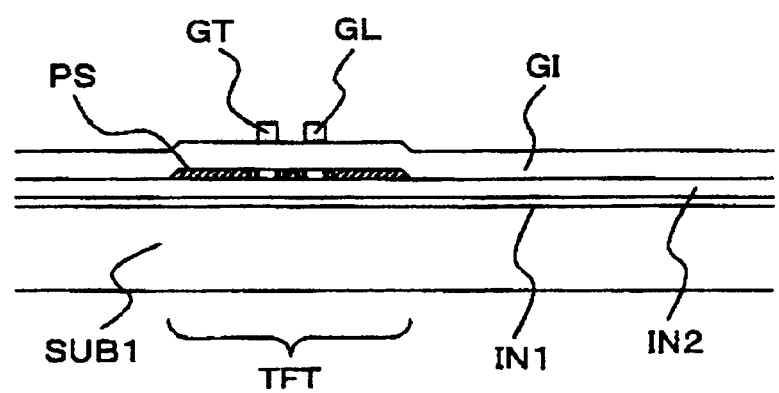
FIG. 4B is a sectional view taken on b-b line in FIG. 4A.

Referring first to FIGS. 4A and 4B, a substrate SUB1 is prepared and a ground insulator film IN1 made of SiN and a ground insulator film IN2 made of SiO are sequentially formed on the surface of the substrate SUB1.

An amorphous silicon layer is formed on the entire surface of ground insulator film IN2, capping the substrate SUB1, through a CVD process and the amorphous silicon layer is crystallized to turn into a poly-silicon layer by irradiating laser light. The poly-silicon layer is selectively etched through photolithography technique to form a semiconductor layer PS. The semiconductor layer PS impersonates a semiconductor layer of a thin-film transistor TFT.

Subsequently, an insulator film GI is formed on the surface of a resulting structure of substrate SUB1 through, for example, a CVD process to cover the semiconductor layer PS.

A MoW alloy layer is formed on the surface of insulator film GI through, for example, a sputtering process and the MoW alloy layer is selectively etched on the basis of the photolithography technique, forming both a gate bus line GL and a gate electrode GT.

Thereafter, with a photo-resist film used for patterning the gate bus line left behind, an N-type impurity (for example, phosphorus) is ion-implanted and after removal of the photo-resist, a dopant at low concentration is further ion-implanted to thereby form an N-type thin-film transistor TFT with an LDD region in a so-called self-alignment fashion.

Figure 5A:
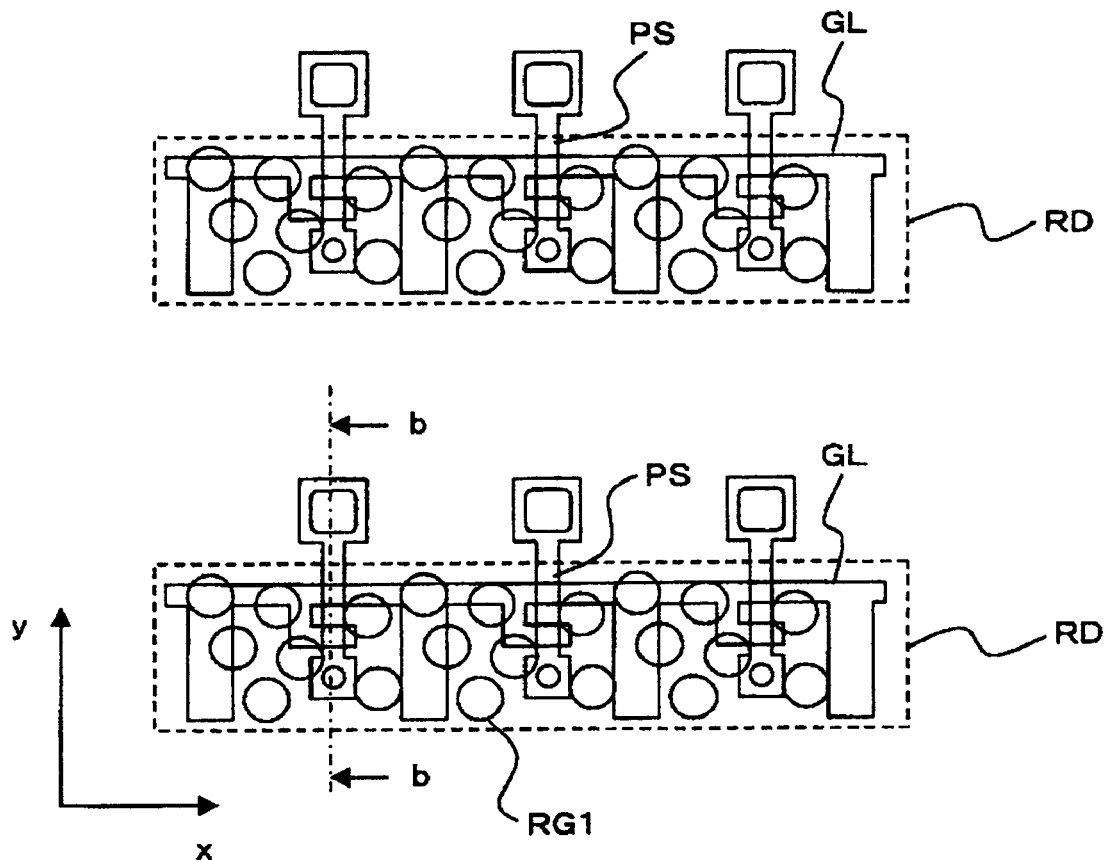
FIG. 5A is a diagram showing, together with FIGS. 4A and 4B and FIGS. 6A to 8B, a series of production steps of the manufacturing method of the liquid crystal display apparatus according to embodiment 1 of the invention.
Figure 5B:
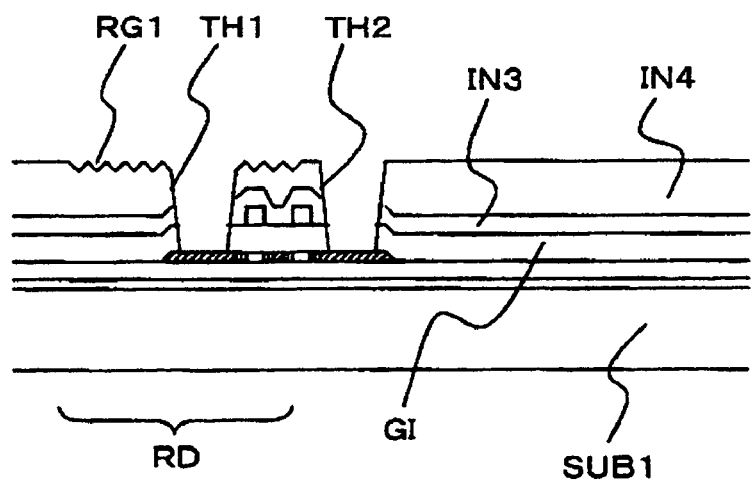
FIG. 5B is a sectional view taken on b-b line in FIG. 5A.

Turning to FIGS. 5A and 5B, an insulator film IN 3 is formed on the surface of a resulting structure of substrate SUB1 through, for example, a CVD process while covering the gate bus line GL and an insulator film IN4 made of, for example, photosensitive resin is formed on the surface of the insulator film IN3.

In the surface of insulator film IN4, many distributed concave (convex) ruggedness segments are formed at a portion representing a reflection domain RD. Formation of the concave (convex) ruggedness segments is carried out using a photolithography technique based on light exposure through a so-called half exposure mask adapted to partially change the transmission factor of light. In this phase, a step of boring through holes TH1 and TH2 in the insulator film IN 4 is executed concurrently to reduce the number of production steps.

Thereafter, by using the insulator film IN4 formed with the through holes TH1 and TH2 as a mask, contact holes are formed in the insulator films IN3 and GI to thereby partly expose opposite ends of the semiconductor layer PS. Consequently, the drain and source regions of the thin-film transistor TFT are partly exposed, respectively.

Figure 6A:
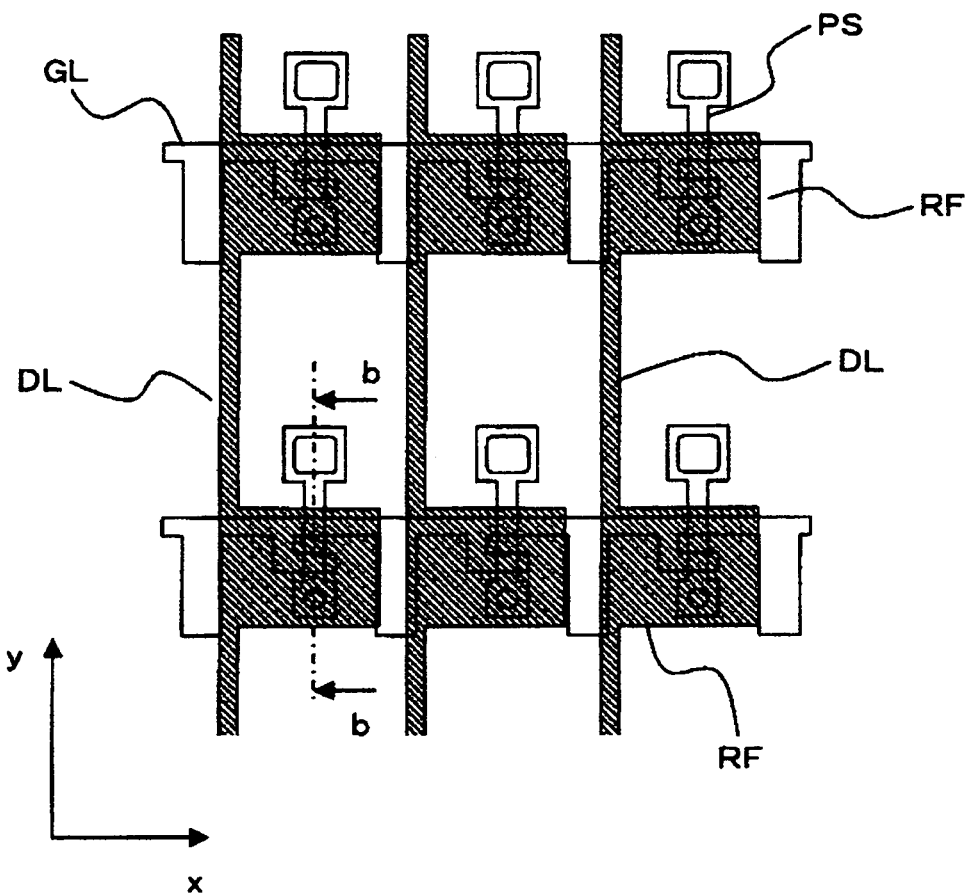
FIG. 6A is a diagram showing, together with FIGS. 4A to 5B and FIGS. 7A to 8B, a series of production steps of the manufacturing method of the liquid crystal display apparatus according to embodiment 1 of the invention.
Figure 6B:
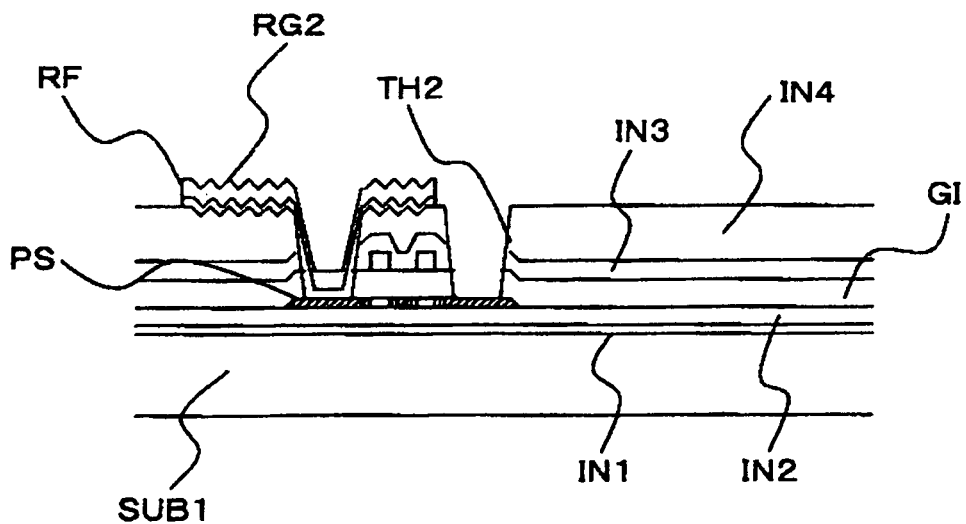
FIG. 6B is a sectional view taken on b-b line in FIG. 6A.

Turning now to FIGS. 6A and 6B, a MoW alloy film and an Al alloy film, for example, are sequentially laminated on the surface of the insulator film IN4 and the laminated film is selectively etched on the basis of the photolithography technique, forming a drain bus line DL and a reflection film RF. In this phase, the drain bus line DL and reflection film RF are formed at a time to reduce the number of production steps.

The surface of the reflection film RF is reflected by the concave (convex) ruggedness RG1 formed on the surface of insulation film IN4 functioning as the ground layer, resulting in formation of concave (convex) ruggedness RG2 similar to the concave (convex) ruggedness RG1.

The reflection film RF is so formed as to cover the wall of the through hole TH1 exposed at the drain region of the thin-film transistor TFT, thus making direct connection to the drain region of the thin-film transistor TFT.

Figure 7A:
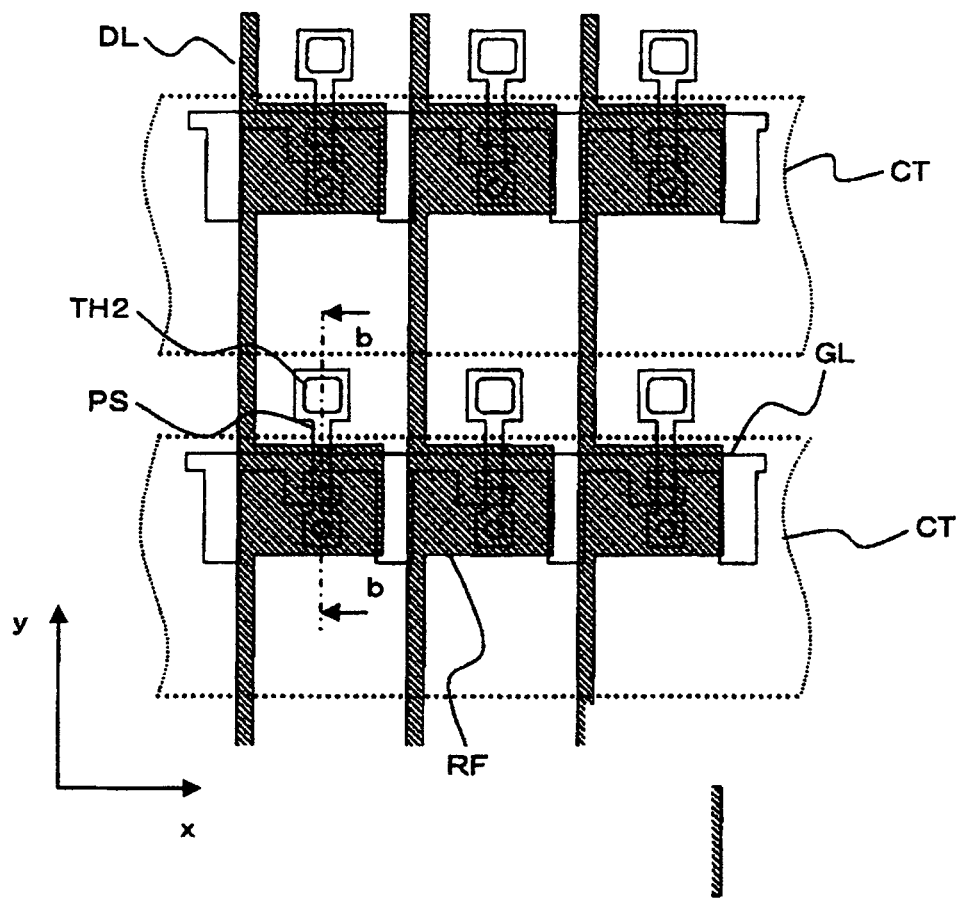
FIG. 7A is a diagram showing, together with FIGS. 4A to 6B and FIGS. 8A and 8B, a series of production steps of the manufacturing method of the liquid crystal display apparatus according to embodiment 1 of the invention.
Figure 7B:
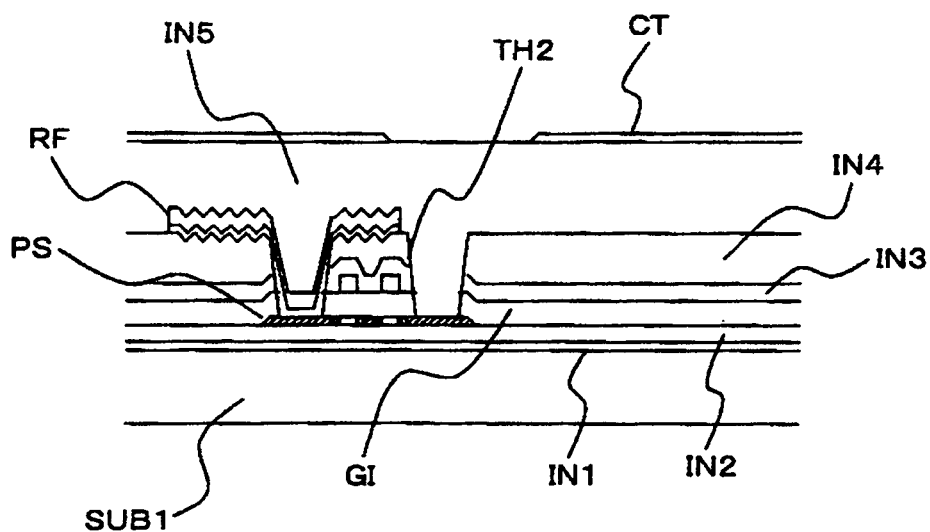
FIG. 7B is a sectional view taken on b-b line in FIG. 7A.

Turning to FIGS. 7A and 7B, the surface of a resulting structure of the substrate SUB1 is coated with, for example, resin to form an insulator film IN5. Thus, the insulator film IN5 whose surface is leveled can be formed.

For example, an ITO film is formed on the surface of the insulator film IN5, which is selectively etched through the photolithography technique to form a counter electrode CT.

Figure 8A:
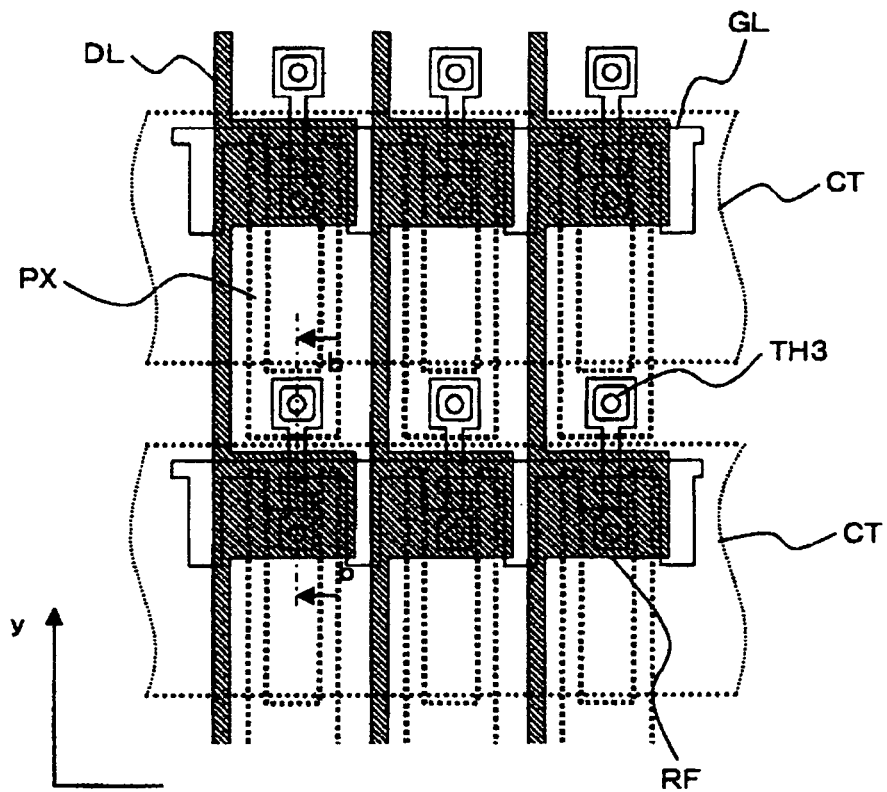
FIG. 8A is a diagram showing, together with FIGS. 4A to 7B, a series of production steps of the manufacturing method of the liquid crystal display apparatus according to embodiment 1 of the invention.
Figure 8B:
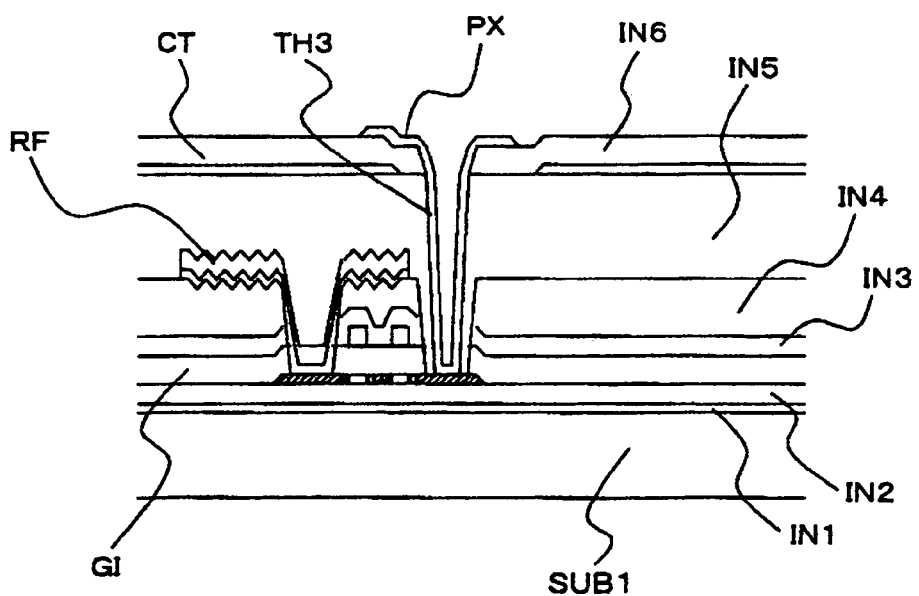
FIG. 8B is a sectional view taken on b-b line in FIG. 8A.

Turning to FIGS. 8A and 8B, an insulator film IN6 made of, for example, SiN is formed on the surface of a thus obtained structure of substrate SUB1. Then, a through hole TH3 passing through the insulator films IN6, IN5, IN4, IN3 and GI is formed to expose a part of the source region of the thin-film transistor TFT.

The insulator films IN5 and IN4 made of, for example, an organic material such as resin can be opened by dry etching using, for example, oxygen with a mask of the photo-resist film and insulator film IN6 used during opening of the insulator film IN6, so that the photo-steps can be reduced in number.

Next, for example, an ITO film is formed on the surface of the insulator film IN6 and it is selectively etched by the photolithography technique to form a pixel electrode PX.

The pixel electrode PX is connected directly to the source region of the thin-film transistor TFT via the through hole TH3, whereby a plurality of such pixel electrodes set up an electrode group.

Embodiment 2

(Equivalent Circuit)

Figure 17:
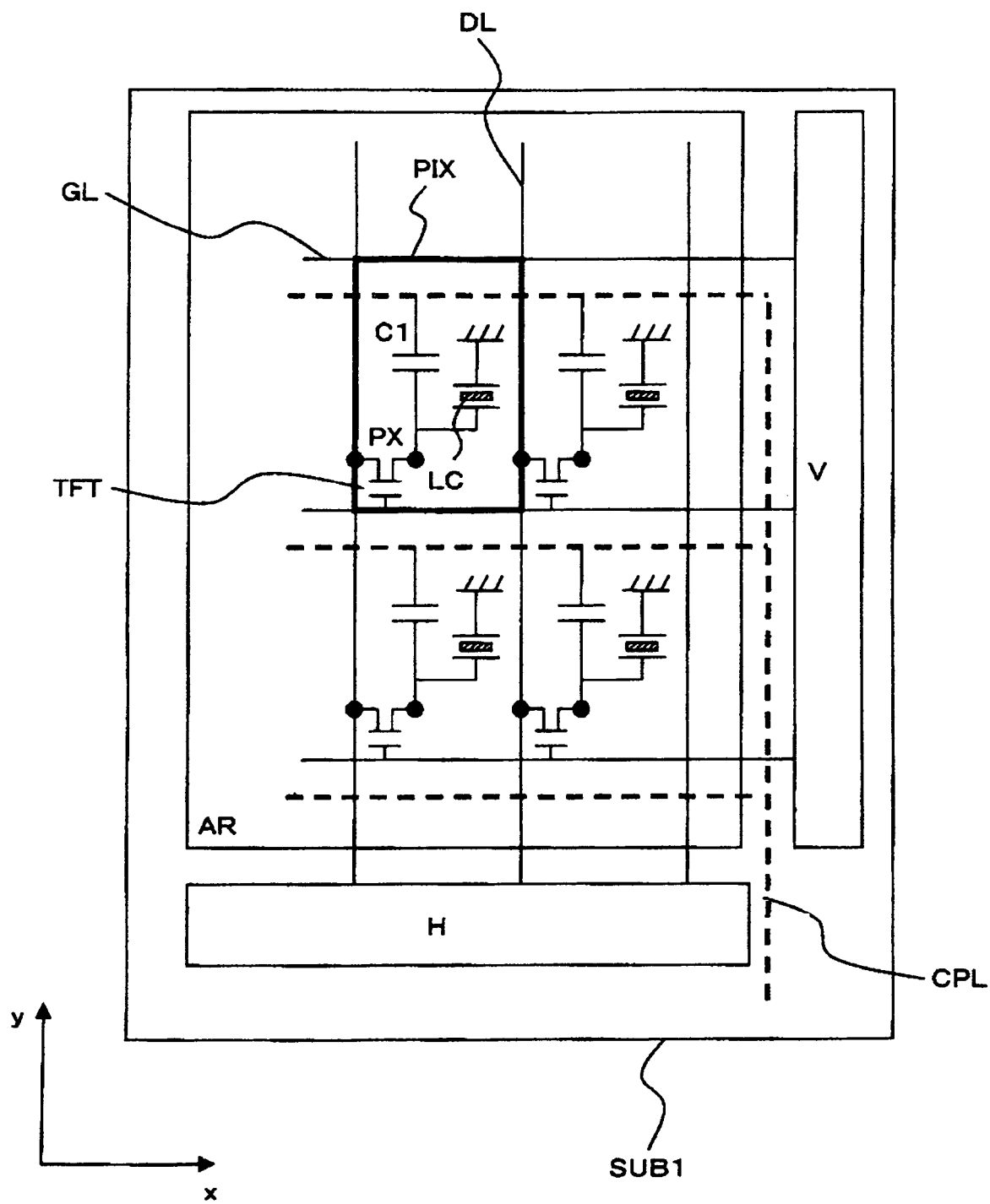
FIG. 17 is an equivalent circuit diagram showing the overall construction of the liquid crystal display apparatus according to embodiment 2 of the invention.

Referring to FIG. 17, there is illustrated an equivalent circuit diagram showing a liquid crystal display apparatus according to embodiment 2 of the present invention. The FIG. 17 diagram corresponds to FIG. 9. The liquid crystal display apparatus as shown in FIG. 17 is constructed in a so-called longitudinal electric field type.

Firstly, this construction differs from the FIG. 9 construction in that the counter electrode CT is not formed on the side of substrate SUB1. This is because a counter electrode is formed on one surface, close to a layer of liquid crystals LC, of a substrate SUB2 which is arranged to oppose the substrate SUB1 via the liquid crystal layer.

Then, a storage line CPL is formed in association with individual pixels PIX and in each pixel, a holding capacitor C1 is formed between a pixel electrode PX and the storage line (capacitor electrode) CPL.

(Construction of Pixel)

Figure 10:
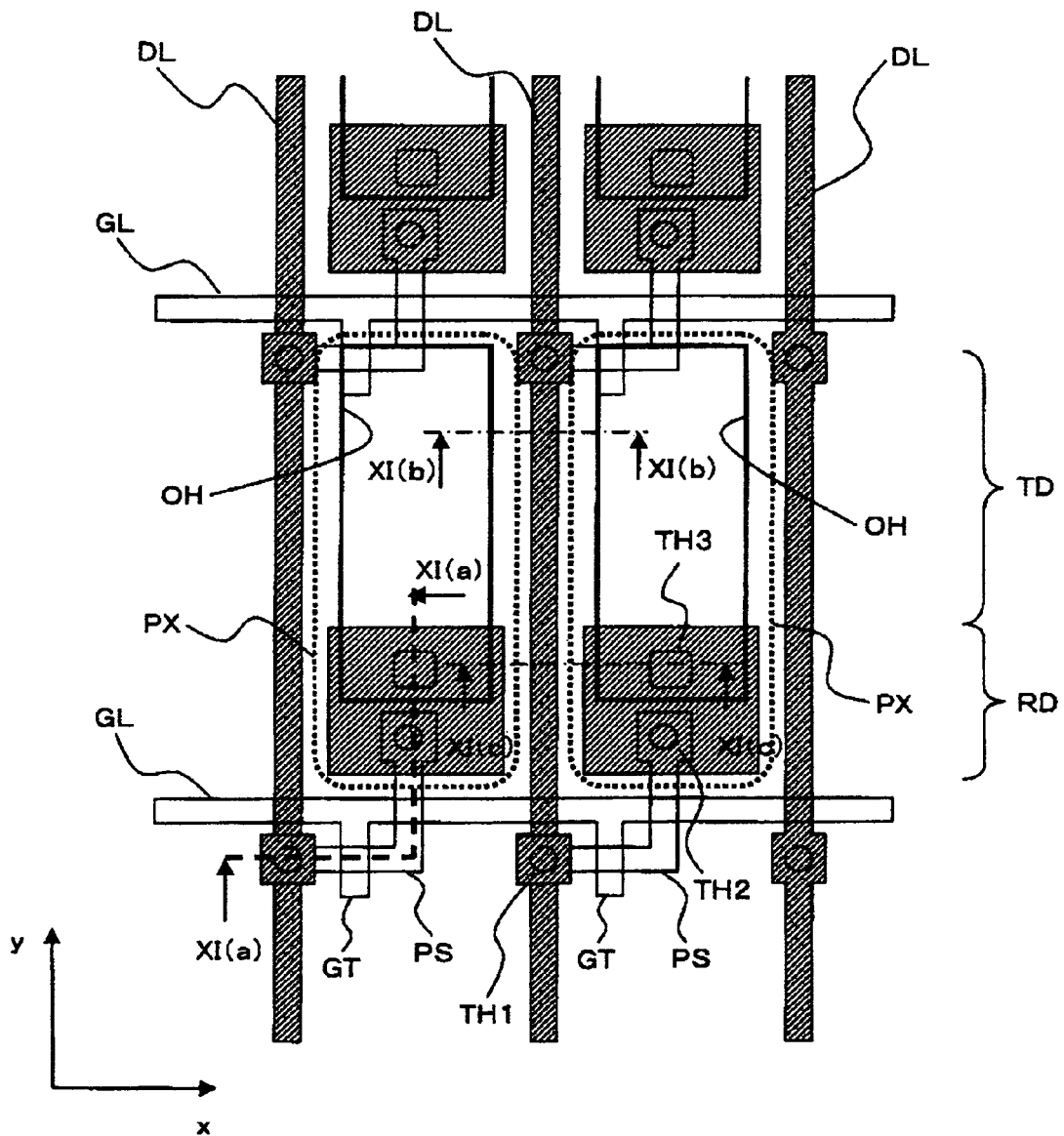
FIG. 10 is a plan view showing the construction of a liquid crystal display apparatus according to embodiment 2 of the present invention, especially depicting the surface, confronting a liquid crystal layer, of one of substrates arranged to oppose to each other through the liquid crystal layer.
Figure 11A:
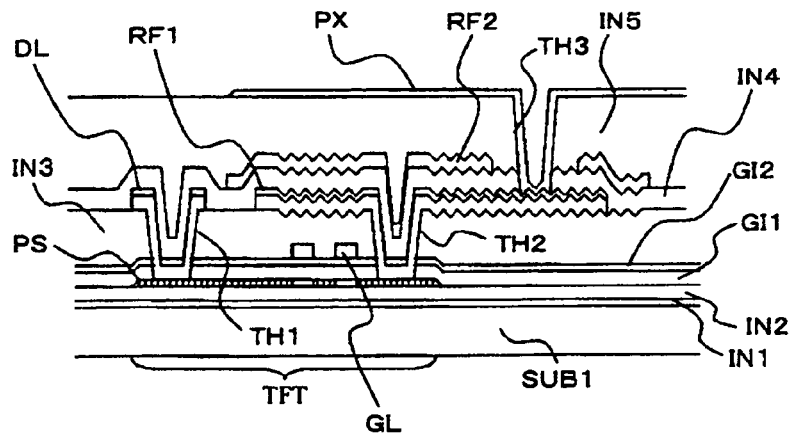
FIGS. 11A to 11C are sectional views taken on lines XI(a)-XI(a), XI(b)-XI(b) and XI(c)-XI(c) in FIG. 10, respectively.
Figure 11B:
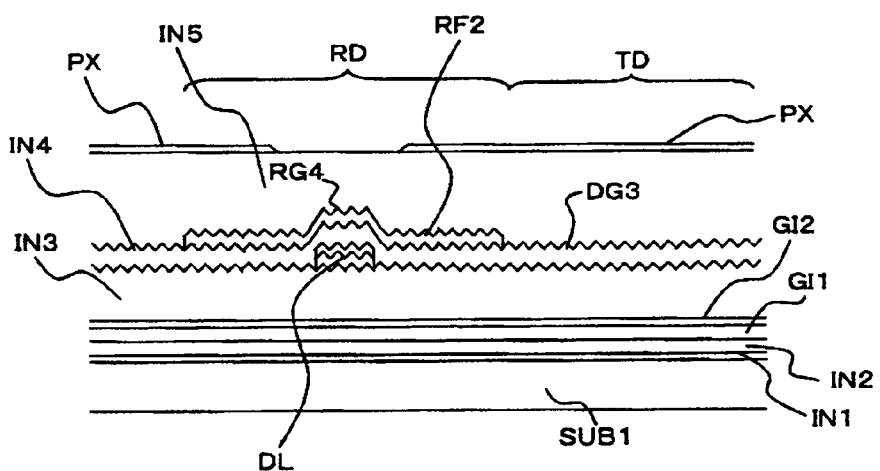
Figure 11C:
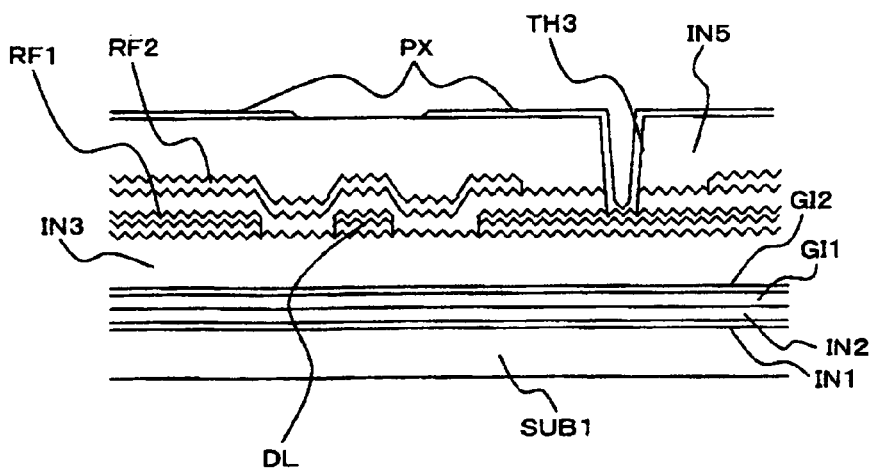

Reference will now be made to FIG. 10 and FIGS. 11A to 11C to explain the construction of the liquid crystal display apparatus according to embodiment 2 of the invention in which the surface nearby liquid crystal of one of the substrates arranged to oppose to each other through the liquid crystal layer is structured as shown therein. A section taken on line XI(a)-XI(a) in FIG. 10 is depicted in FIG. 11A, a section taken on line XI(b)-XI(b) is depicted in FIG. 11B and a section taken on line XI(c)-XI(c) is depicted in FIG. 11C.

In FIG. 10, one pixel is structured in each region surrounded by respective drain bus lines DL extending in y direction and juxtaposed in x direction and by respective gate bus lines GL extending in x direction and juxtaposed in y direction in the figure.

Then, in each pixel, a light transmission domain TD having a width smaller than the pitch between adjacent drain bus lines DL is structured in a preceding (as viewed in y direction on the sheet of drawing) region and a light reflection domain RD is structured in a succeeding (also as viewed in y direction on the sheet of drawing) region.

In the present embodiment, a thin-film transistor TFT provided for a preceding pixel is formed in, for example, a preceding portion of an adjacently succeeding pixel (as viewed in y direction on the sheet of drawing).

As shown in FIG. 11A, on the surface, close to a layer of liquid crystals, of a substrate SUB1 made of glass, a ground insulator film IN1 made of SiN and a ground insulator film IN2 made of SiO are sequentially laminated. Each of the ground insulator films IN1 and IN2 has the function of preventing impurities inside the substrate SUB1 from migrating into a semiconductor layer PS to be described later.

The semiconductor layer PS having an island shape is formed within a pixel on the surface of the ground insulator film IN2 to extend to a portion of an adjacently succeeding pixel. The semiconductor layer PS is made of, for example, poly-silicon and is so formed as to act as a semiconductor layer of the thin-film transistor TFT functioning as a pixel drive device for each pixel.

The semiconductor layer PS extends in y direction in FIG. 10 to across an overlying gate bus line GL (see FIG. 10 and FIG. 11A as well) and is bent to the left as shown in FIG. 10. In this manner, the semiconductor layer PS is formed having one end positioned in the area of a preceding pixel and the other end positioned in the area of another pixel adjacently succeeding in y direction.

The semiconductor layer PS is so arranged as to cross, through the medium of gate insulator films GI1 and GI2, the overlying gate bus line GL and a gate electrode GT branching from the gate bus line GL, having the one end (preceding) as a source region and the other end (succeeding) as a drain region.

Then, on the surface of a resulting structure of substrate SUB1 formed with the semiconductor layer PS, an insulator film GI1 made of, for example, SiO and an insulator film GI2 made of, for example, SiN are laminated. Within an area of formation of the thin-film transistor TFT, the insulator films GI1 and GI2 function as a gate insulating film of the transistor TFT.

On the surface of the insulator film GI2, the gate bus lines GL extending in x direction and juxtaposed in y direction in FIG. 10 are formed. The gate bus line GL is so formed as to extend over the boundary between areas of the preceding and adjacently succeeding pixels in y direction, crossing the underlying semiconductor layer PS.

Then, the gate bus line GL is patterned such that it branches, near the intersection with the underlying semiconductor layer PS, to a gate electrode GT arranged to cross a substantially central portion of the underlying semiconductor layer PS. The portion of gate bus line GL crossing the underlying semiconductor layer PS also functions as the gate electrode of thin-film transistor TFT.

After completion of formation of the gate bus line GL and gate electrode GT, an impurity is doped by using the gate bus line GL and gate electrode GT as a mask in order that the thin-film semiconductor TFT which has channels formed in the semiconductor layer PS beneath the gate bus line GL and gate electrode GT can be obtained.

Thereafter, on the surface of a resulting structure of substrate SUB1 above which the gate bus line GL is formed, an insulator film IN3 made of, for example, an organic material such as resin is formed. With the insulator film IN3 formed, the surface capping the substrate can be flattened.

Further, in the surface of the insulator film IN3, many distributed concave (convex) ruggedness segments RG1 are formed at a region excepting a connection portion to be described later where the drain bus line DL connects to the drain region of the thin-film transistor TFT.

On the surface of the thus formed insulator film IN3, one of the drain bus lines DL extending in y direction and juxtaposed in x direction in FIG. 10 is formed.

Then, part of the drain bus line DL is electrically connected directly to the drain region of the thin-film transistor TFT by way of a through hole TH1 bored in the insulator films IN3, GI2 and GI1 to pass therethrough.

Simultaneously with the formation of the drain bus line DL, a first reflection film RF1 is formed within a succeeding portion of the pixel such that it physically separates from the drain bus line DL, that is, it is slightly spaced apart from the drain bus line DL.

Then, part of the first reflection film RF1 is electrically connected directly to the source region of the thin-film transistor TFT by way of a through hole TH2 bored in the insulator films IN3, GI2 and GI1 to pass therethrough.

Each of the drain bus line DL and first reflection film RF1 is constructed by sequentially laminating, for example, MoCr alloy and Ag alloy. This is because the MoCr alloy can make good connection to the semiconductor layer PS and the Ag alloy has a high reflection factor.

Further, concave (convex) ruggedness segments RG2 are formed at a portion excepting the connection part of the drain bus line DL to the drain region of thin-film transistor TFT and at the first reflection film RF1. These concave (convex) ruggedness segments RG2 are so formed as to reflect the concave (convex) ruggedness segments RG1 formed in the surface of the insulator film IN3.

On the surface of a resulting structure of substrate SUB1 formed with the drain bus line DL and first reflection film RF1, an insulator film IN4 made of, for example, SiN is formed. The surface of the insulator film IN4 is also formed with concave (convex) ruggedness segments RG3 which are so formed as to reflect the concave (convex) ruggedness segments RG1 formed on the insulator film IN3.

Then, on the surface of insulator film IN4, a second reflection film RF2 made of, for example, an Ag alloy is formed.

Figure 15A:
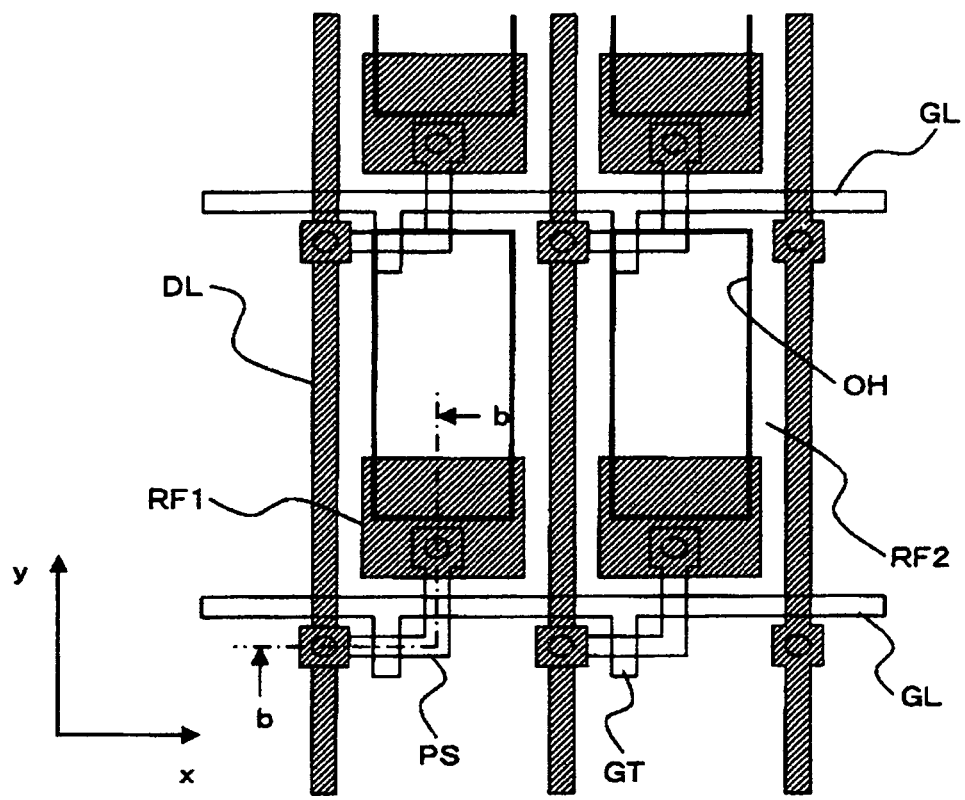
FIG. 15A is a diagram showing, together with FIGS. 12A to 14B and FIGS. 16A and 16B, a series of production steps of the manufacturing method of the liquid crystal display apparatus according to embodiment 2 of the invention.

The second reflection film RF2 is formed with an opening OH as shown in FIGS. 10 and 15A, including a portion impersonating the light transmission domain TD and at least a part of light reflection domain RD impersonating an electrical connection portion between the first reflection film RF1 and a pixel electrode PX to be described later (indicated by a through hole TH3 in the figure).

The opening OH in the second reflection film RF2 is formed slightly distantly from the right and left drain bus lines DL to thereby permit an area between the light transmission domain TD and each drain bus line DL to function as a light reflection area.

Then, the second reflection film RF2 functions as the storage line (capacitor electrode) CPL shown in FIG. 17, so that a capacitor element having the insulator film IN4 as a dielectric film is set up between the second and first reflection films RF2 and RF1.

On the surface of the second reflection film RF2, concave (convex) ruggedness segments RG4 are formed. These concave (convex) ruggedness segments RG4 are so formed as to reflect the concave (convex) ruggedness segments RG3 formed on the surface of the insulator film IN4.

On the surface of a resulting structure of substrate SUB1 formed with the second reflection film RF2 in this manner, an insulator film IN5 made of, for example, an organic material such as resin is formed. The surface of the thus formed insulator film IN5 can be leveled.

Then, within the pixel area, the pixel electrode PX is formed on the surface of the insulator film IN5. The pixel electrode PX is so formed as to cover almost of the central portion excepting a slight peripheral portion and passes through the through hole TH3 so formed as to pass through the insulator films IN5 and IN4, connecting directly to the first reflection film RF1. With this construction, the pixel electrode PX can be connected electrically to the source region of thin-film transistor TFT by way of the first reflection film RF1.

Effects of Construction of Embodiment 2

With the liquid crystal display apparatus constructed as above, the efficient light reflection can be accomplished with the help of the first and second reflection films RF1 and RF2.

Since the first reflection film RF1 is formed concurrently with the formation of the drain bus line DL, an increase in the number of production steps can be avoided.

Further, since the pixel electrode PX is formed on the top of the leveling insulator film IN5, the thickness of the layer of liquid crystals LC can be uniformed, improving the quality of display.

(Manufacturing Method)

Reference will now be made to FIGS. 12A to 16B showing an embodiment of production steps of manufacturing the liquid crystal apparatus shown in FIG. 10, especially illustrating procedures of manufacturing the structure on the liquid crystal layer nearby surface of the substrate SUB1. Of these FIGS. 12A to 16B, figures suffixed with A are plan views and figures suffixed with B are sectional views taken on b-b line in the A figures. The following description will be given in order of production steps.

Figure 12A:
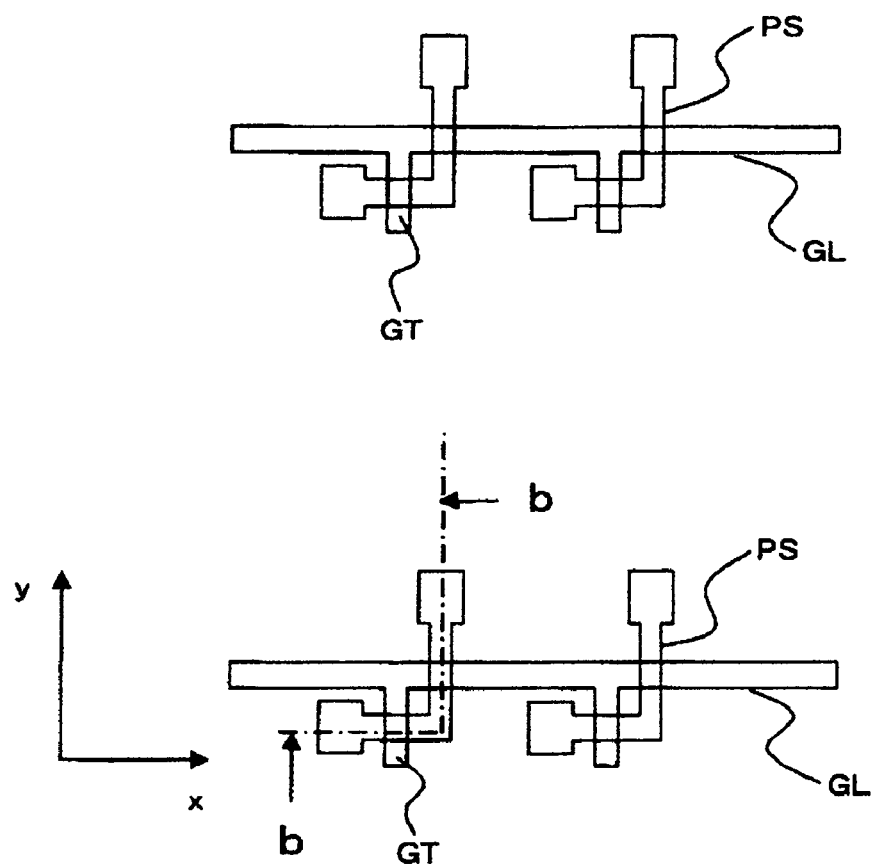
FIG. 12A is a diagram showing, together with FIGS. 13A to 16B, a series of production steps of a manufacturing method of the liquid crystal display apparatus according to embodiment 2 of the invention.
Figure 12B:
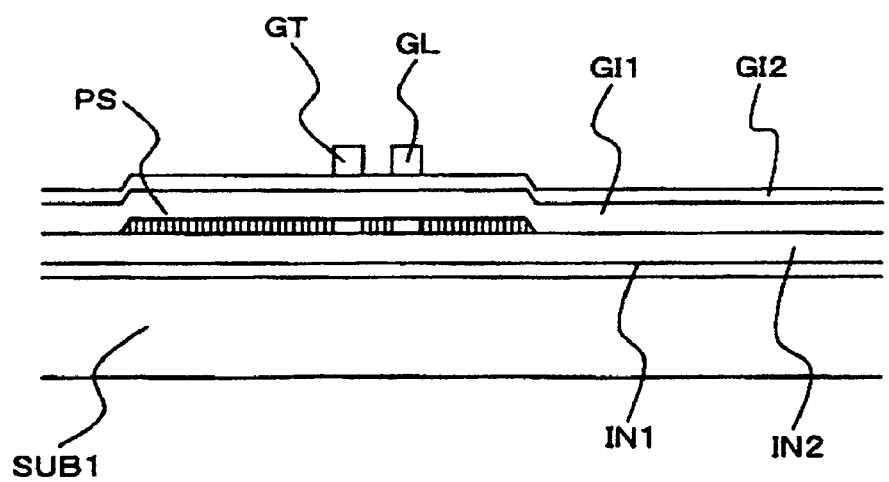
FIG. 12B is a sectional view taken on b-b line in FIG. 12A.

Referring first to FIGS. 12A and 12B, a substrate SUB1 is prepared and a ground insulator film IN1 made of SiN and a ground insulator film IN2 made of SiO are sequentially formed on the surface of the substrate SUB1.

An amorphous silicon layer is formed on the entire surface of ground insulator film IN2 overlying the substrate SUB1 through a CVD process, for example, and the amorphous silicon layer is crystallized to turn into a poly-silicon layer by irradiating laser light. The poly-silicon layer is selectively etched through photolithography technique to form a semiconductor layer PS. The semiconductor layer PS impersonates a semiconductor layer of a thin-film transistor TFT.

Subsequently, an insulator film GI1 made of SiO and an insulator film GI2 made of SiN are formed on the surface of a resulting structure of substrate SUB1 by sequentially laminating them through, for example, a CVD process to cover the semiconductor layer PS.

A MoCr alloy layer is formed on the surface of insulator film GI2 through, for example, a sputtering process and the MoCr alloy layer is selectively etched on the basis of the photolithography technique, forming a gate bus line GL. Preferably, so-called wet etching is used for the selective etching.

Thereafter, with a photo-resist film used for patterning the gate bus line GL removed, a P-type impurity (for example, boron) is ion-implanted and a dopant at low concentration is further ion-implanted to thereby form a P-type drain region and a source region in the semiconductor layer PS. Subsequently, an annealing process is carried out.

Figure 13A:
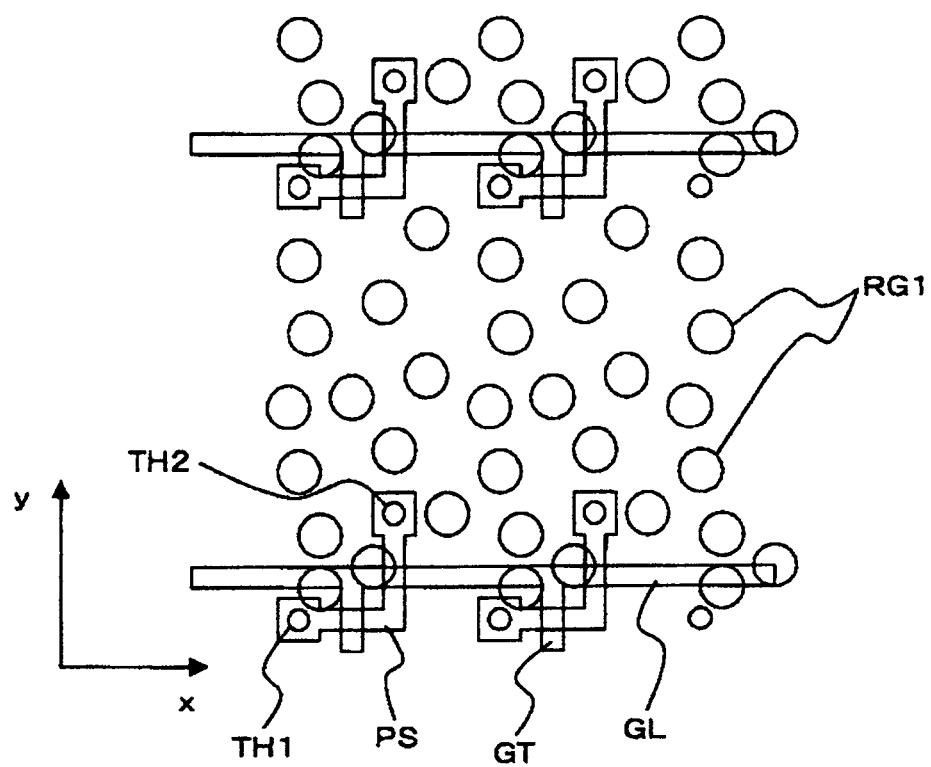
FIG. 13A is a diagram showing, together with FIGS. 12A and 12B and FIGS. 14A to 16B, a series of production steps of the manufacturing method of the liquid crystal display apparatus according to embodiment 2 of the invention.
Figure 13B:
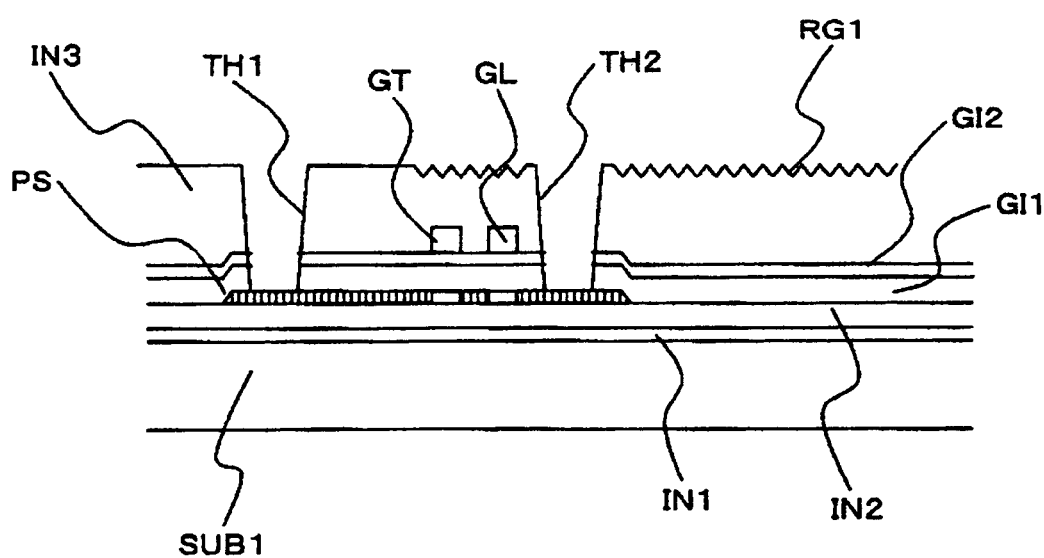
FIG. 13B is a sectional view taken on b-b line in FIG. 13A.

Turning to FIGS. 13A and 13B, an insulator film IN3 made of photosensitive resin is formed on the surface of a resulting structure of substrate SUB1 to cover the gate bus line GL In the surface of insulator film IN3, many distributed concave (convex) ruggedness segments RG1 are formed. The formation of the concave (convex) ruggedness segments RG1 is carried out using a photolithography technique based on light exposure by way of, for example, a so-called half exposure mask adapted to partially change the transmission factor of light. In this phase, a step of boring through holes TH1 and TH2 in the insulator film IN3 is executed concurrently to reduce the number of production steps.

Thereafter, by using the insulator film IN3 formed with the through holes TH1 and TH2 as a mask, contact holes are formed in the insulator films GI2 and GI1 to thereby partly expose opposite ends of the semiconductor layer PS. In this manner, the drain and source regions of the thin-film transistor TFT are partly exposed, respectively.

Figure 14A:
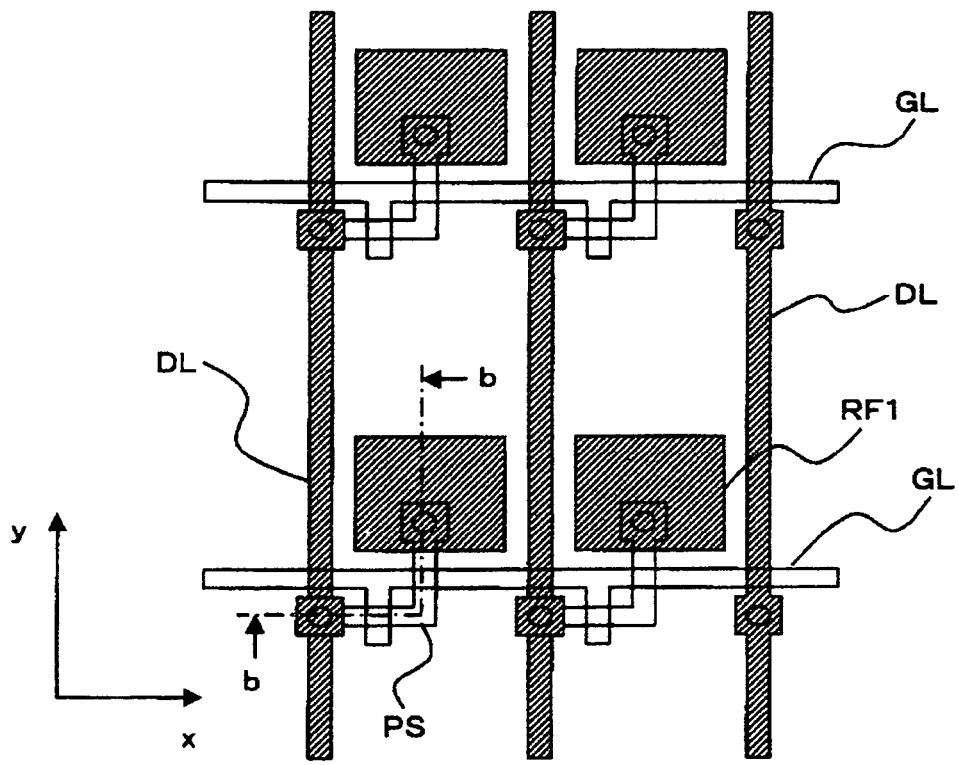
FIG. 14A is a diagram showing, together with FIGS. 12A to 13B and FIGS. 15A to 16B, a series of production steps of the manufacturing method of the liquid crystal display apparatus according to embodiment 2 of the invention.
Figure 14B:
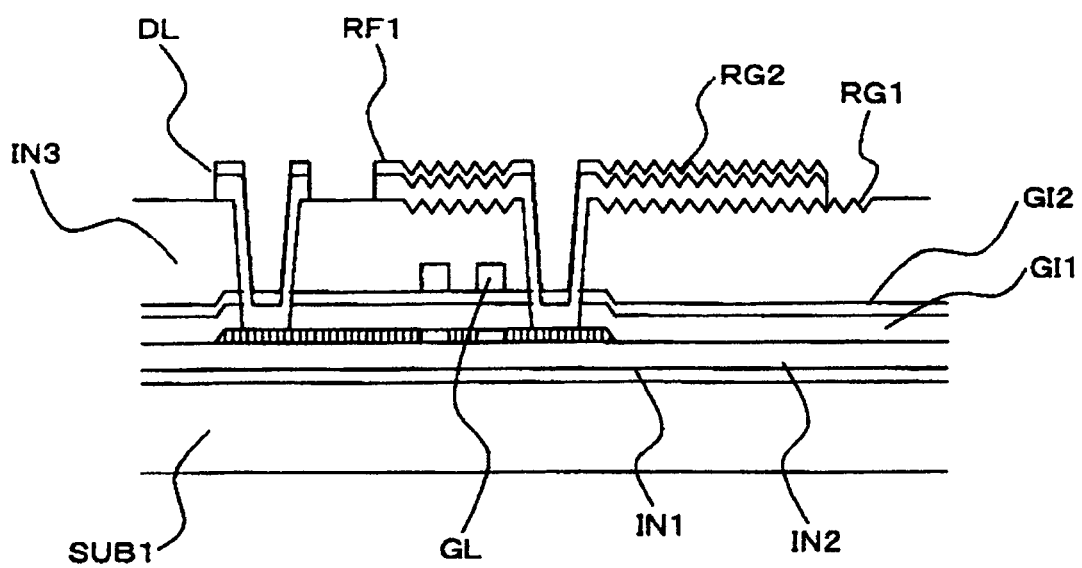
FIG. 14B is a sectional view taken on b-b line in FIG. 14A.

Turning now to FIGS. 14A and 14B, a MoCr alloy film and an Ag alloy film, for example, are sequentially laminated on the surface of insulator film IN3 and the laminated film is selectively etched on the basis of the photolithography technique, forming a drain bus line DL and a first reflection film RF1. In this phase, the drain bus line DL and first reflection film RF1 are formed at a time to reduce the number of production steps.

The surface of the first reflection film RF1 reflects the concave (convex) ruggedness RG1 formed on the surface of insulator film IN3 functioning as the ground layer, resulting in formation of concave (convex) ruggedness RG2 similar to the concave (convex) ruggedness RG1.

Part of the drain bus line DL is so formed as to cover the wall of the through hole TH1, thus making direct connection to the drain region of the thin-film transistor TFT.

Part of the first reflection film RF1 is so formed as to cover the wall of the through hole TH2, thus making direct connection to the source region of the thin-film transistor TFT.

Figure 15B:
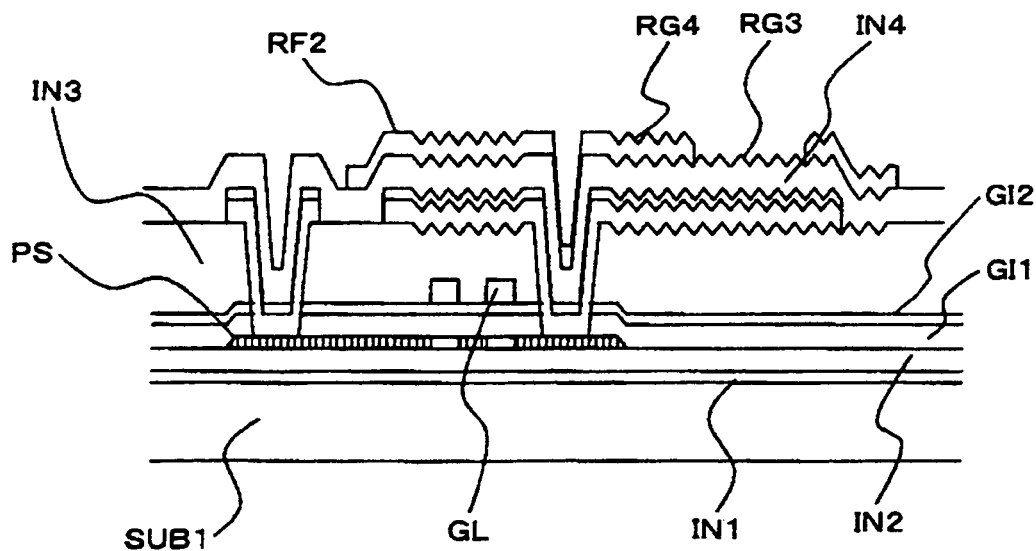
FIG. 15B is a sectional view taken on b-b line in FIG. 15A.

Referring to FIGS. 15A and 15B, an insulator film IN4 made of, for example, SiN is formed on the surface of a resulting structure of substrate SUB1 through a CVD process. The concave (convex) ruggedness RG1 formed on the surface of insulator film IN3 or the concave (convex) ruggedness RG2 formed on the surface of reflection film RF1 are reflected on the surface of the insulator film IN4, thus forming concave (convex) ruggedness RG3.

On the surface of a resulting structure of substrate SUB1, an Al alloy layer, for example, is formed through a sputtering process, an opening OH is formed at a substantially central portion of the pixel and a second reflection film RF2 is formed at a portion excepting the opening.

Formed in the surface of the second reflection film RF2 is concave (convex) ruggedness RG4 reflecting the ruggedness RG3 formed on the insulator film IN4.

Figure 16A:
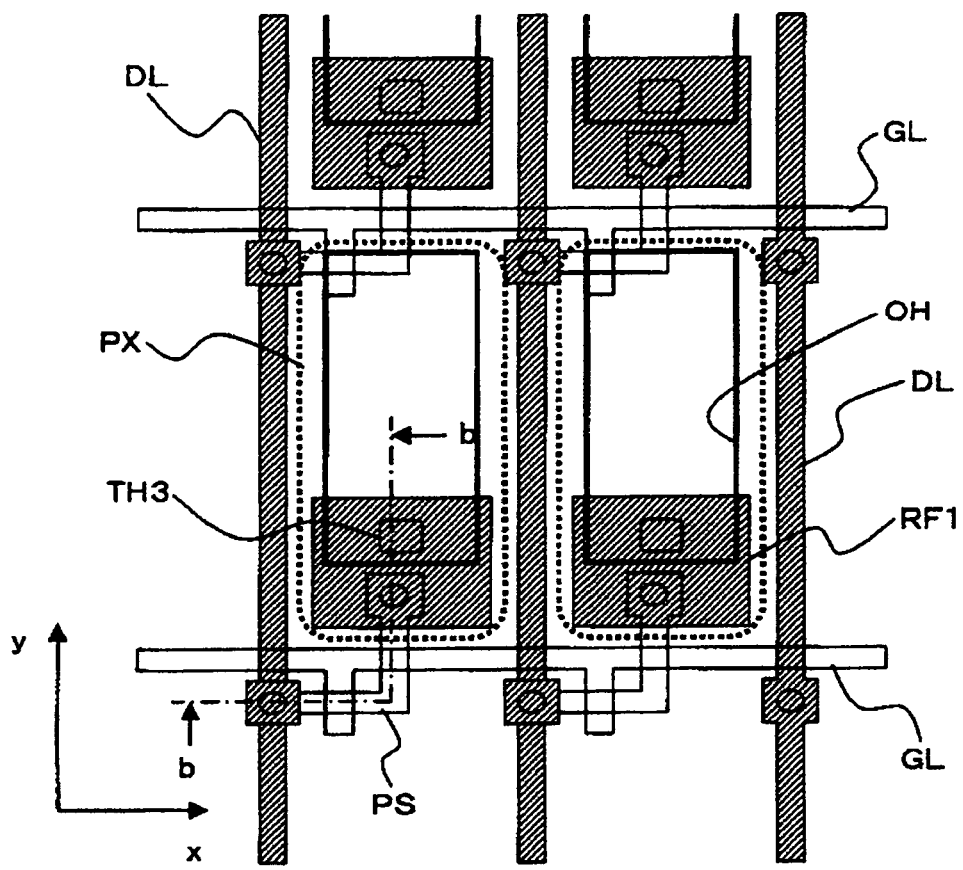
FIG. 16A is a diagram showing, together with FIGS. 12A to 15B, a series of production steps of the manufacturing method of the liquid crystal display apparatus according to embodiment 2 of the invention.
Figure 16B:
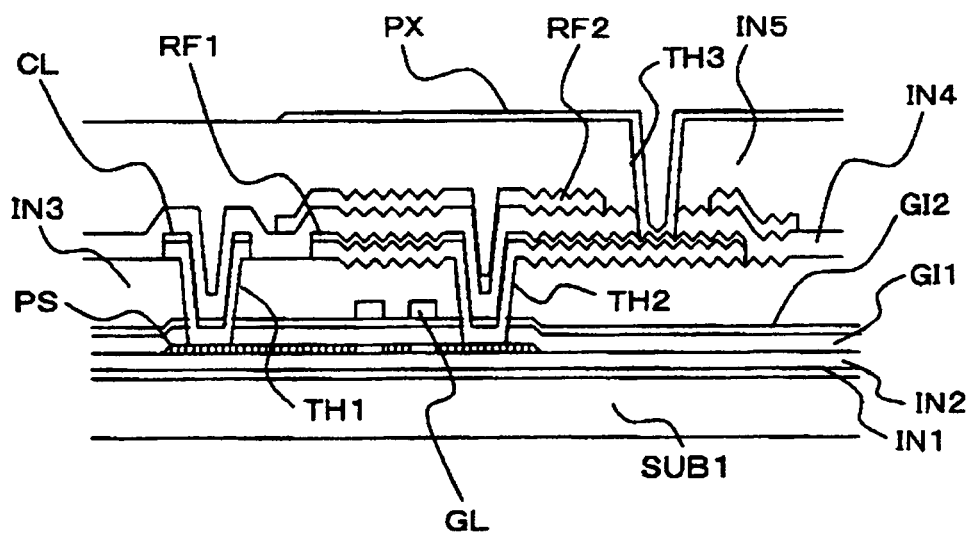
FIG. 16B is a sectional view taken on b-b line in FIG. 16A.

Turning to FIGS. 16A and 16B, an insulator film IN5 is formed on a resulting structure of substrate SUB1 by coating photosensitive resin, having its surface flattened or leveled.

Then, a through hole TH3 is bored in the insulator film IN5 to partly expose the first reflection film RF1.

An ITO film is formed on the surface of the insulator film IN5 and it is selectively etched on the basis of photolithography technique to form a pixel electrode PX. The pixel electrode PX is electrically connected to the first reflection film RF1 by way of the wall of the through hole TH3.

The foregoing embodiments may be used solely or in combination so that the effects of the individual embodiments may be accomplished solely or in a potentiation fashion.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display apparatus comprising pixel electrodes each supplied with a video signal from a drain bus line through a thin-film transistor driven by a scanning signal from a gate bus line, wherein
said pixel includes at least a light reflection film within its area, said light reflection film being flush with said drain bus line and having its surface formed with concave and convex ruggedness segments;
said pixel electrode is formed on an insulator film formed to cover said light reflection film and having its surface leveled; and
an electrode overlapping said light reflection film and insulated from said pixel electrode is intervened in said insulator film.

2. A liquid crystal display apparatus according to claim 1, wherein said pixel electrode and said electrode insulated from said pixel electrode are each formed of a transparent electrically conductive film.

3. A liquid crystal display apparatus according to claim 1, wherein said light reflection film is connected to one of drain bus lines positioned on both sides of a pixel and separated from the other drain bus line and at least a projection or extension of the gate bus line overlaps the separation portion.

4. A liquid crystal display apparatus according to claim 2, wherein the liquid crystal display apparatus is of the in plane switching type and said pixel electrode is so formed as to overlap said electrode insulated from said pixel electrode, a group of a plurality of said pixel electrodes being provided.

5. A liquid crystal display apparatus according to claim 2, wherein the liquid crystal display apparatus is of the longitudinal field type and said electrode insulated from said pixel electrode is a capacitor electrode.

6. A liquid crystal display apparatus according to claim 1, wherein said electrode insulated from said pixel electrode is formed of a light reflection film having ruggedness on its surface.

7. A liquid crystal display apparatus according to claim 6, wherein said light reflection film flush with the drain bus line and said electrode insulated from said pixel electrode constitute a capacitor having as a dielectric film the insulator film interposed between said light reflection film and said electrode.

8. A liquid crystal display apparatus according to claim 6, wherein said electrode insulated from said pixel electrode is so formed as to stride over the respective drain bus lines on the both sides of a pixel.

9. A liquid crystal display apparatus according to claim 1, wherein said reflection film is electrically connected directly to a drain region of said thin-film transistor by way of a through hole formed in an insulator film underlying the reflection film.

10. A liquid crystal display apparatus according to claim 1, wherein said pixel electrode is electrically connected directly to a source region of said thin-film transistor by way of a through hole formed in an insulator film underlying said pixel electrode.

11. A liquid crystal display apparatus according to claim 1, wherein a semiconductor layer of said thin-film transistor is comprised of a poly-silicon layer.

* * * * *